(12) United States Patent
Bienkowski et al.

(10) Patent No.: US 9,582,400 B1
(45) Date of Patent: *Feb. 28, 2017

(54) DETERMINING WHEN TO EVALUATE PROGRAM CODE AND PROVIDE RESULTS IN A LIVE EVALUATION PROGRAMMING ENVIRONMENT

(71) Applicant: The MathWorks, Inc., Natick, MA (US)

(72) Inventors: Joseph R. Bienkowski, Ashland, MA (US); Claudia G. Wey, Wayland, MA (US); Michelle D. Erickson, Watertown, MA (US); Benjamin V. Hinkle, Brookline, MA (US); Jared D. MacDonald, Cambridge, MA (US); John E. Booker, Natick, MA (US)

(73) Assignee: The MathWorks, Inc., Natick, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/733,544

(22) Filed: Jun. 8, 2015

Related U.S. Application Data

(63) Continuation of application No. 14/068,283, filed on Oct. 31, 2013, now Pat. No. 9,053,228, which is a (Continued)

(51) Int. Cl.
G06F 9/44 (2006.01)
G06F 11/36 (2006.01)
(Continued)

(52) U.S. Cl.
CPC ........... *G06F 11/3664* (2013.01); *G06F 3/013* (2013.01); *G06F 3/0489* (2013.01)

(58) Field of Classification Search
CPC .............................. G06F 11/3664; G06F 3/013
(Continued)

(56) References Cited

U.S. PATENT DOCUMENTS

| 4,931,928 A | 6/1990 | Greenfeld |
| 5,317,740 A | 5/1994 | Sites |

(Continued)

FOREIGN PATENT DOCUMENTS

WO    WO 2008/082610    7/2008

OTHER PUBLICATIONS

Yin et al, "A Fine-Grained Debugger for Aspect-Oriented Programming" ACM, pp. 59-70, 2012.*
(Continued)

*Primary Examiner* — Anil Khatri
(74) *Attorney, Agent, or Firm* — Harrity & Harrity, LLP

(57) ABSTRACT

A device may provide a user interface that includes a first section for displaying multiple portions of program code and a second section for displaying multiple results of evaluating the multiple portions of program code. The device may detect an evaluation trigger associated with an unevaluated portion of program code of the multiple portions of program code. The device may determine one or more portions of program code to be evaluated based on detecting the evaluation trigger. The one or more portions of program code may be less than the multiple portions of program code. The device may cause the one or more portions of program code to be evaluated to generate one or more corresponding results. The device may provide the one or more corresponding results for display via the second section of the user interface.

20 Claims, 20 Drawing Sheets

Related U.S. Application Data continuation-in-part of application No. 14/059,872, filed on Oct. 22, 2013, now Pat. No. 9,053,235.

(51) Int. Cl.
  *G06F 3/0489* (2013.01)
  *G06F 3/01* (2006.01)
(58) Field of Classification Search
  USPC .................................. 717/123–129, 140–142
  See application file for complete search history.

(56) References Cited

U.S. PATENT DOCUMENTS

| | | | |
|---|---|---|---|
| 5,327,568 A | 7/1994 | Maejima et al. | |
| 5,339,428 A | 8/1994 | Burmeister et al. | |
| 5,604,895 A | 2/1997 | Raimi | |
| 5,649,222 A | 7/1997 | Mogilevsky | |
| 5,673,390 A | 9/1997 | Mueller | |
| 5,675,803 A | 10/1997 | Preisler et al. | |
| 5,754,860 A * | 5/1998 | McKeeman | G06F 11/3684 |
| | | | 714/E11.208 |
| 5,758,061 A | 5/1998 | Plum | |
| 5,781,776 A | 7/1998 | Johnston et al. | |
| 5,854,924 A | 12/1998 | Rickel et al. | |
| 5,872,976 A | 2/1999 | Yee et al. | |
| 5,933,640 A | 8/1999 | Dion | |
| 5,966,532 A | 10/1999 | McDonald et al. | |
| 6,115,544 A | 9/2000 | Mueller | |
| 6,131,185 A | 10/2000 | Coskun et al. | |
| 6,195,765 B1 | 2/2001 | Kislanko et al. | |
| 6,202,199 B1 | 3/2001 | Wygodny et al. | |
| 6,202,200 B1 | 3/2001 | House et al. | |
| 6,237,138 B1 * | 5/2001 | Hameluck | G06F 11/34 |
| | | | 702/182 |
| 6,249,882 B1 | 6/2001 | Testardi | |
| 6,263,489 B1 | 7/2001 | Olsen et al. | |
| 6,282,701 B1 * | 8/2001 | Wygodny | G06F 11/3466 |
| | | | 702/183 |
| 6,305,008 B1 | 10/2001 | Vaidyanathan et al. | |
| 6,353,923 B1 | 3/2002 | Bogle et al. | |
| 6,367,068 B1 | 4/2002 | Vaidyanathan et al. | |
| 6,385,769 B1 | 5/2002 | Lewallen | |
| 6,408,430 B2 | 6/2002 | Gunter et al. | |
| 6,434,738 B1 | 8/2002 | Arnow | |
| 6,490,696 B1 | 12/2002 | Wood et al. | |
| 6,493,868 B1 | 12/2002 | DaSilva et al. | |
| 6,542,900 B1 | 4/2003 | Xia | |
| 6,691,303 B2 | 2/2004 | Guthrie et al. | |
| 6,694,509 B1 | 2/2004 | Stoval et al. | |
| 6,792,595 B1 | 9/2004 | Storistenau et al. | |
| 6,836,884 B1 | 12/2004 | Evans et al. | |
| 6,915,509 B1 | 7/2005 | Chkodrov et al. | |
| 6,925,635 B2 | 8/2005 | Garvey | |
| 6,971,084 B2 | 11/2005 | Grey et al. | |
| 6,988,264 B2 | 1/2006 | Sarma et al. | |
| 7,020,852 B2 | 3/2006 | Oeltjen et al. | |
| 7,055,140 B2 * | 5/2006 | Bystricky | G06F 11/3644 |
| | | | 712/227 |
| 7,058,928 B2 * | 6/2006 | Wygodny | G06F 11/3636 |
| | | | 714/E11.212 |
| 7,089,534 B2 | 8/2006 | Hartman et al. | |
| 7,127,704 B2 | 10/2006 | Van De Vanter et al. | |
| 7,134,115 B2 | 11/2006 | Kawai et al. | |
| 7,146,613 B2 | 12/2006 | Chauvel et al. | |
| 7,171,655 B2 | 1/2007 | Gordon et al. | |
| 7,200,838 B2 | 4/2007 | Kodosky et al. | |
| 7,222,333 B1 | 5/2007 | Mor et al. | |
| 7,257,804 B2 | 8/2007 | Baecker et al. | |
| 7,302,675 B2 | 11/2007 | Rogers et al. | |
| 7,343,588 B2 | 3/2008 | Bates et al. | |
| 7,383,534 B1 | 6/2008 | Agbabian et al. | |
| 7,444,619 B2 | 10/2008 | McManus | |
| 7,448,026 B1 | 11/2008 | Gustafson et al. | |
| 7,475,385 B2 | 1/2009 | Huemiller, Jr. | |
| 7,496,906 B2 * | 2/2009 | Black-Ziegelbein | G06F 11/3624 |
| | | | 717/124 |
| 7,506,304 B2 | 3/2009 | Morrow et al. | |
| 7,516,441 B2 | 4/2009 | Hamilton et al. | |
| 7,519,952 B2 | 4/2009 | Bordawekar et al. | |
| 7,530,052 B2 | 5/2009 | Morrow et al. | |
| 7,584,452 B1 | 9/2009 | Johnson | |
| 7,636,914 B1 | 12/2009 | Johnson | |
| 7,650,592 B2 | 1/2010 | Eckels et al. | |
| 7,669,187 B2 | 2/2010 | Liu et al. | |
| 7,669,188 B2 * | 2/2010 | Nickell | G06F 8/72 |
| | | | 714/19 |
| 7,673,289 B1 | 3/2010 | Johnson | |
| 7,685,570 B2 | 3/2010 | Draine et al. | |
| 7,694,277 B2 | 4/2010 | Yuknewicz et al. | |
| 7,698,691 B2 * | 4/2010 | Chen | G06F 11/0778 |
| | | | 714/100 |
| 7,823,135 B2 | 10/2010 | Horning et al. | |
| 7,917,894 B2 | 3/2011 | Chen et al. | |
| 7,949,995 B2 | 5/2011 | Sadlek | |
| 7,984,428 B1 | 7/2011 | Seymour | |
| 8,037,452 B2 | 10/2011 | Minium et al. | |
| 8,079,019 B2 | 12/2011 | Lindo et al. | |
| 8,087,002 B2 | 12/2011 | Fjeldstad et al. | |
| 8,104,021 B2 | 1/2012 | Erlingsson et al. | |
| 8,136,102 B2 * | 3/2012 | Papakipos | G06F 8/456 |
| | | | 717/136 |
| 8,146,058 B2 | 3/2012 | Sarkar et al. | |
| 8,151,244 B2 | 4/2012 | Hsu et al. | |
| 8,219,980 B2 | 7/2012 | Bates et al. | |
| 8,250,524 B2 * | 8/2012 | Barnett | G06F 8/51 |
| | | | 717/110 |
| 8,296,730 B2 | 10/2012 | Whitechapel et al. | |
| 8,296,738 B1 * | 10/2012 | Kiel | G06F 11/3624 |
| | | | 717/125 |
| 8,312,435 B2 * | 11/2012 | Wygodny | G06F 11/3636 |
| | | | 717/124 |
| 8,365,149 B2 * | 1/2013 | Frank | G06F 8/44 |
| | | | 717/125 |
| 8,365,286 B2 | 1/2013 | Poston | |
| 8,392,885 B2 | 3/2013 | Stall et al. | |
| 8,443,348 B2 * | 5/2013 | McGuire | G06F 8/45 |
| | | | 312/200 |
| 8,468,502 B2 * | 6/2013 | Lui | G06F 11/3612 |
| | | | 717/125 |
| 8,572,578 B2 * | 10/2013 | Stall | G06F 11/362 |
| | | | 717/129 |
| 8,589,888 B2 | 11/2013 | Cui et al. | |
| 8,593,703 B2 | 11/2013 | Kort | |
| 8,595,703 B2 * | 11/2013 | van Gogh | G06F 11/3604 |
| | | | 714/38.1 |
| 8,601,442 B2 * | 12/2013 | Shafi | G06F 11/323 |
| | | | 717/125 |
| 8,640,103 B2 | 1/2014 | Sheppard | |
| 8,656,351 B2 | 2/2014 | Kodosky et al. | |
| 8,676,966 B2 * | 3/2014 | Podjarny | G06F 11/3676 |
| | | | 709/217 |
| 8,683,318 B1 | 3/2014 | Dasari et al. | |
| 8,689,188 B2 * | 4/2014 | Bassin | G06F 11/3672 |
| | | | 702/182 |
| 8,719,793 B2 * | 5/2014 | Maeda | G06F 8/74 |
| | | | 717/125 |
| 8,762,956 B1 | 6/2014 | Simoneau et al. | |
| 8,799,871 B2 | 8/2014 | Baker | |
| 8,832,663 B2 | 9/2014 | Krauss | |
| 8,839,204 B2 | 9/2014 | Gounares et al. | |
| 8,862,950 B1 * | 10/2014 | Ginsberg | G06F 11/3688 |
| | | | 714/25 |
| 8,863,085 B1 | 10/2014 | Stahlberg | |
| 8,887,138 B2 * | 11/2014 | Eker | G06F 11/3664 |
| | | | 717/119 |
| 8,893,084 B2 * | 11/2014 | Parker | G06F 9/4443 |
| | | | 345/619 |
| 8,904,349 B2 | 12/2014 | Hudson et al. | |
| 8,935,673 B1 * | 1/2015 | Ashkenazi | G06F 11/3612 |
| | | | 702/186 |

(56) References Cited

U.S. PATENT DOCUMENTS

| | | | |
|---|---|---|---|
| 8,938,718 B2* | 1/2015 | Krauss | G06F 11/362 |
| | | | 717/124 |
| 8,978,014 B1* | 3/2015 | Larsen | G06F 11/3668 |
| | | | 717/125 |
| 8,997,063 B2 | 3/2015 | Krajec et al. | |
| 9,053,228 B1 | 6/2015 | Bienkowski et al. | |
| 9,053,235 B1 | 6/2015 | Bienkowski et al. | |
| 2002/0049838 A1 | 4/2002 | Sylor | |
| 2002/0100016 A1 | 7/2002 | Van De Vanter et al. | |
| 2002/0184611 A1 | 12/2002 | Endejan | |
| 2003/0163801 A1 | 8/2003 | Thames et al. | |
| 2003/0200533 A1 | 10/2003 | Roberts et al. | |
| 2003/0221184 A1 | 11/2003 | Gunjal et al. | |
| 2004/0083457 A1 | 4/2004 | Boucher | |
| 2004/0143819 A1 | 7/2004 | Cheng et al. | |
| 2005/0015751 A1 | 1/2005 | Grassens | |
| 2005/0065990 A1 | 3/2005 | Allen | |
| 2005/0102653 A1 | 5/2005 | Henderson et al. | |
| 2005/0223363 A1 | 10/2005 | Black-Ziegelbein et al. | |
| 2005/0235265 A1 | 10/2005 | Allen | |
| 2006/0156286 A1 | 7/2006 | Morgan | |
| 2006/0212843 A1 | 9/2006 | Zaky et al. | |
| 2007/0169004 A1 | 7/2007 | Prakash | |
| 2007/0226543 A1 | 9/2007 | Young et al. | |
| 2008/0092123 A1 | 4/2008 | Davison et al. | |
| 2008/0109790 A1 | 5/2008 | Farnham et al. | |
| 2008/0127067 A1 | 5/2008 | Aubertine et al. | |
| 2008/0141222 A1 | 6/2008 | Alpern | |
| 2008/0141226 A1 | 6/2008 | Girouard et al. | |
| 2008/0178143 A1 | 7/2008 | Dougan et al. | |
| 2009/0070738 A1 | 3/2009 | Johnson | |
| 2009/0125888 A1 | 5/2009 | Von Der Ahe | |
| 2010/0050157 A1 | 2/2010 | Daniel | |
| 2010/0287525 A1 | 11/2010 | Wagner | |
| 2011/0307870 A1 | 12/2011 | Stairs et al. | |
| 2012/0131547 A1 | 5/2012 | Muir | |
| 2013/0053996 A1 | 2/2013 | Wu | |
| 2013/0311973 A1 | 11/2013 | Rice et al. | |

OTHER PUBLICATIONS

Dyer et al, "A Decision Tree-based Approach to Dynamic Pointcut Evaluation", ACM, pp. 1-10, 2008.*

Reps et al, "Intermediate-Representation Recovery from Low-Level Code", ACM, pp. 100-111, 2006.*

Debois, "Imperative Program Optimization by Partial Evaluation", ACM, pp. 113-122, 2004.*

Urma et al, "Programming Language Evolution via Source Code Query Languages", ACM, pp. 35-38, 2012.*

Berges et al, "Evaluation of Source Code with Item Response Theory", ACM, pp. 51-56, 2015.*

Diop et al, "QoS-aware Multipath—TCP extensions for mobile and multimedia applications", ACM, pp. 141-146, 2011.*

Lelli et al, "Automatic Detection of GUI Design Smells: The Case of Blob Listener", ACM, pp. 263-274, 2016.*

Silva et al, "Generating User Interface Code in a Model Based User Interface Development Environment", ACM, pp. 155-260, 2000.*

Savidis et al, "Software Refactoring Process for Adaptive User-Interface Composition", ACM, pp. 19-28, 2010.*

Fontana et al, "Impact of Refactoring on Quality Code Evaluation", ACM, pp. 37-40, 2011.*

Zitser et al, "Testing Static Analysis Tools using Exploitable Buffer Overflows from Open Source Code", ACM, pp. 97-106, 2004.*

Jiang et al, "Generalized Cofactoring for Logic Function Evaluation", ACM, pp. 155-158, 2003.*

Fontana et al., "Impact of Refactoring on Quality Code Evaluation", ACM, pp. 37-40, 2011.

Ficco et al., "Bug Localization in Test-Driven Development", Hindawi Publishing Corporation, Advances in Software Engineering, vol. 2011, Article ID 492757, pp. 1-18, 2011.

DiGiuseppe, "Automatically Describing Software Faults", ACM, pp. 711-714, 2013.

Fontana et al., "Investigating the Impact of Code Smells Debt on Quality Code Evaluation", IEEE, pp. 15-22, 2012.

Karinthi et al., "Incremental re-execution of programs," SIGPLAN '87 Papers of the Symposium on Interpreters and Interpretive techniques, 1987, pp. 38-44.

Saff et al., "Reducing wasted development time via continuous testing," $14^{th}$ International Symposium on Software Reliability Engineering, 2003, pp. 281-292.

Moher, "Provide: a process visualization and debugging environment," IEEE Transactions on Software Engineering, vol. 14, Issue 6, 1988, pp. 849-857.

Schwartz et al., "Incremental compilation in Magpie," ACM SIGLPAN Notices—Proceedings of the SIGPLAN '84 symposium on compiler constructions, vol. 19, Issue 6, 1984, pp. 122-131.

Steinert et al., "Continuous Selective Testing," Proceedings of the international Conference on Agile Software Development (XP), Springer LNBIP 48, 2010, pp. 132-146.

Henderson et al., "Continuous execution: the VisiProg environment," ICSE '85 Proceedings of the $8^{th}$ International conference on Software engineering, 1985, pp. 68-74.

Kortenkamp et al., "A Suite of Tools for Debugging Distributed Autonomous Systems," Kluwer Academic Publishers, 2004, pp. 157-187.

Saff et al., "An Experimental Evaluation of Continuous Testing During Development," ISSTA'04, Boston, Massachusetts, USA, Copyright 2004 ACM 1-58113-820-2/04/0007, Jul. 11-14, 2004, pp. 76-85.

Xie et al., "Using Redundancies to Find Errors," IEEE Transactions on Software Engineering, vol. 29, Issue 10, 2003, pp. 915-928.

Snelting et al., "How to Build LD Parsers Which Accept Incomplete Input," ACM SIGPLAN Notices Homepage archive, vol. 25, Issue 4, 1990, pp. 51-58.

Eng, "Combining Static and Dynamic Data in Code Visualization", ACM, pp. 43-50, 2002.

Genz et al, "Overcoming Limitations of the SystemC Data Introspection", ACM, pp. 590-593, 2009.

Ding et al, "A Comiler Scheme for Reusing Intermediate Computation Results", IEEE, pp. 1-12, 2004.

Song et al, "Enhancing Source-Level Programming Tool with An Awareness of Transparent Program Transformations", ACM, 301-318, 2009.

Ohshima et al, "KScript and KSWorld: A Time-Aware and Mostly Declarative Language and Interactive GUI Framework", ACM, pp. 117-134, 2013.

Bret Victor, "Inventing on Principle- on Vimeo", www.vimeo.com/36579366, Sep. 12, 2012 (print date), 3 pages.

"Computer Science | Khan Academy", www.khanacademy.org/cs, Sep. 25, 2012 (print date), 5 pages.

David Gallardo, "Getting Started with the Eclipse Platform Using Eclipse Plug-Ins to Edit, Comple and Debug your App", Nov. 1, 2002, pp. 1-16.

"Eclipse Platform Technical Overview", published by IBM, Apr. 19, 2006, pp. 1-19.

David Saff et al., "An experimental evaluation of continuous testing during development", http://people.csail.mit.edu/mernst/pubs/ct-user-study-issta2004.pdf (2004).

David Saff et al., "Continuous Testing in Eclipse", http://people.csail.mit.edu/mernst/pubs/contest-plugin-etx2004.pdf (2004).

David Saff et al., "Continuous Testing in Eclipse", *Electronic Notes in Theoretical Computer Science*, vol. 107:103-117 (2004).

International Search Report for Application No. PCT/US2007/026422, dated Sep. 29, 2008.

European Office Action for Application No. 07868098.8 dated Jan. 29, 2010, 5 pages.

Notification of transmittal of the International Search Report and the Written Opinion of the International Searching Authority, or the Declaration corresponding to PCT/US2013/062335 mailed Feb. 20, 2014, 11 pages.

(56) References Cited

OTHER PUBLICATIONS

Notification of transmittal of the International Search Report and the Written Opinion of the International Searching Authority, or the Declaration corresponding to PCT/US2013/062236 mailed Feb. 20, 2014, 11 pages.

* cited by examiner

DETERMINING WHEN TO EVALUATE PROGRAM CODE AND PROVIDE RESULTS IN A LIVE EVALUATION PROGRAMMING ENVIRONMENT

RELATED APPLICATION

This application is a continuation of U.S. patent application Ser. No. 14/068,283, (now U.S. Pat. No. 9,053,228) which is a continuation-in-part (CIP) of U.S. patent application Ser. No. 14/059,872, filed on Oct. 22, 2013, (now U.S. Pat. No. 9,053,235) the contents of which are incorporated by reference herein in their entirety.

DETAILED DESCRIPTION

The following detailed description of example implementations refers to the accompanying drawings. The same reference numbers in different drawings may identify the same or similar elements.

A live evaluation programming environment may receive program code (e.g., new program code or modifications to existing program code), and may provide a result of evaluating the program code while the program code or other program code is being input or modified. However, it may be difficult to determine when the program code should be evaluated, what program code should be evaluated, and when to display results of the evaluation. For example, a user (e.g., a computer programmer) may become frustrated if a result is displayed too early, such as before the user wants to see the result (e.g., before the user has finished typing a line of program code). On the other hand, the user may become frustrated if a result is displayed too late, such as some time period after the user wants to see the result. Implementations described herein may be utilized to determine when to evaluate program code in a live evaluation programming environment, what program code to evaluate, and when to display results of modifications to a program that includes program code.

Figure 1A:
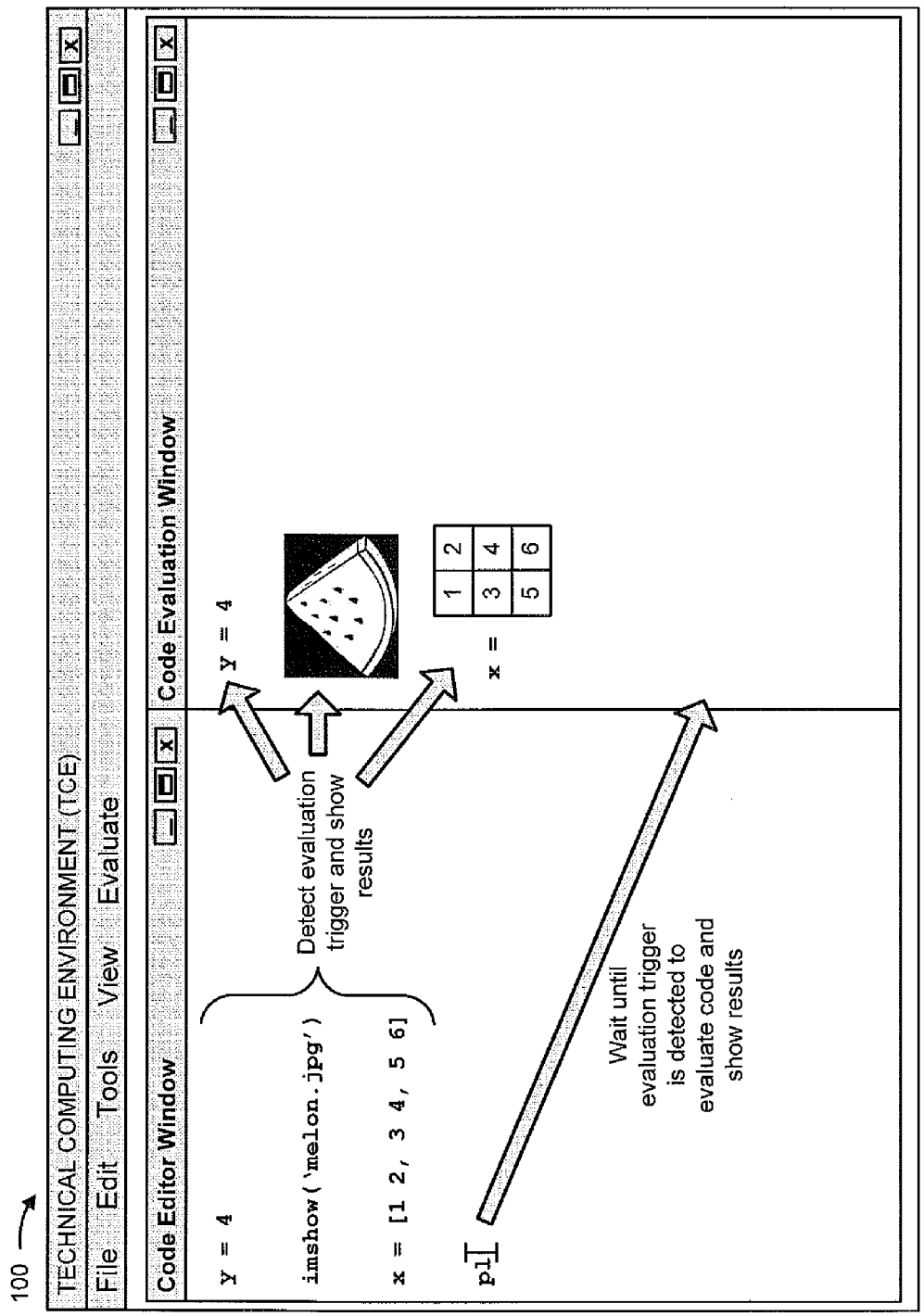
FIGS. 1A and 1B are diagrams of an overview of an example implementation described herein.
Figure 1B:
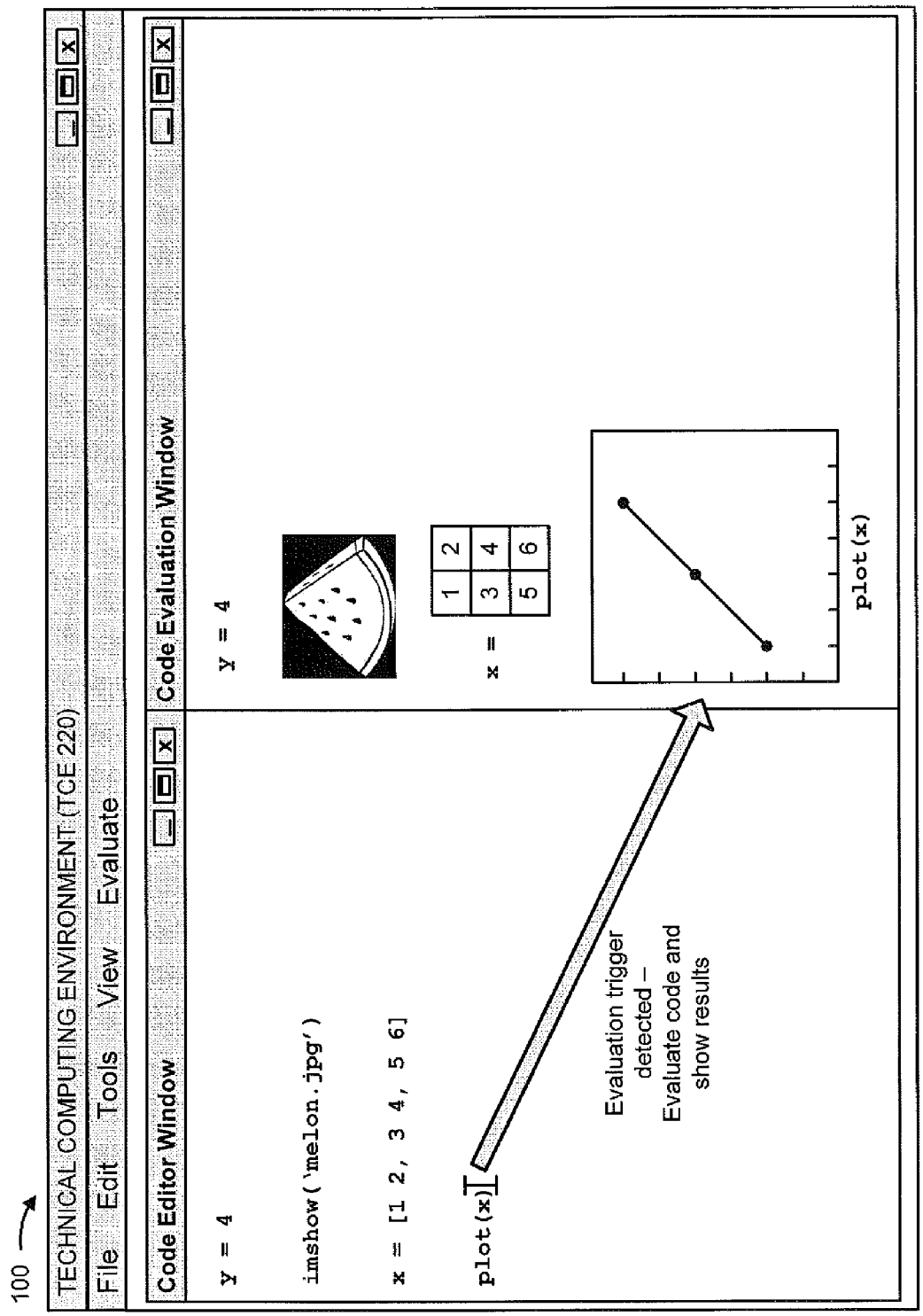

FIGS. 1A and 1B are diagrams of an overview of an example implementation 100 described herein. FIGS. 1A and 1B depict an example of a live evaluation programming environment, where a user may input program code via a code editor window of a user interface, and where results of evaluating the program code may be provided in real-time via a code evaluation window. Real-time may refer to a processing delay that is not so long as to inconvenience a user. For example, a user may consider a processing delay of 500 milliseconds to be fast enough to be real-time for purposes of seeing results when typing a line of code. In other situations, real-time can include processing delays shorter than 500 milliseconds or longer than 500 milliseconds. The results may be provided or updated dynamically while the user is interacting with the program code. The live evaluation programming environment may be included in, for example, a technical computing environment (TCE) executing on a client device.

As shown in FIG. 1A, assume that a user has input three lines of program code via a code editor window of a TCE executing on a client device. The three lines of program code are shown as y=4, imshow('melon.jpg'), and x=[1 2, 3 4, 5 6]. Further, assume that the client device has detected an evaluation trigger that causes the client device to evaluate (e.g., execute) these three lines of code. An evaluation trigger may include a condition that, when satisfied, instructs the client device to evaluate program code (e.g., a carriage return, a mouse input, a pause of input for a particular duration, etc.). As shown, based on detecting the evaluation trigger, the client device evaluates the three lines of code and provides, via a code evaluation window of the TCE, three corresponding results of evaluating the three respective lines of code. As further shown, assume that the user has begun to input a fourth line of program code, shown as "pl". Because the user has not finished inputting the fourth line of program code, the client device does not evaluate the code, and does not show a result of evaluating the code, as shown.

As shown in FIG. 1B, assume that, at a later time, the user has finished inputting the fourth line of program code, shown as plot(x). Based on detecting that the user has finished inputting the fourth line of program code (and/or based on another evaluation trigger), the client device may evaluate the fourth line of program code, and may provide a result of evaluating the fourth line of program code, shown as a plot in the code evaluation window. This is merely one example of an evaluation trigger, and other examples are described elsewhere herein. The evaluation trigger may be used by the client device to determine when to evaluate one or more lines of code and/or when to provide a result of evaluating the code. In this way, the client device may be configured to provide results when the user expects the results, thus enhancing the user experience in a live evaluation programming environment.

Figure 2:
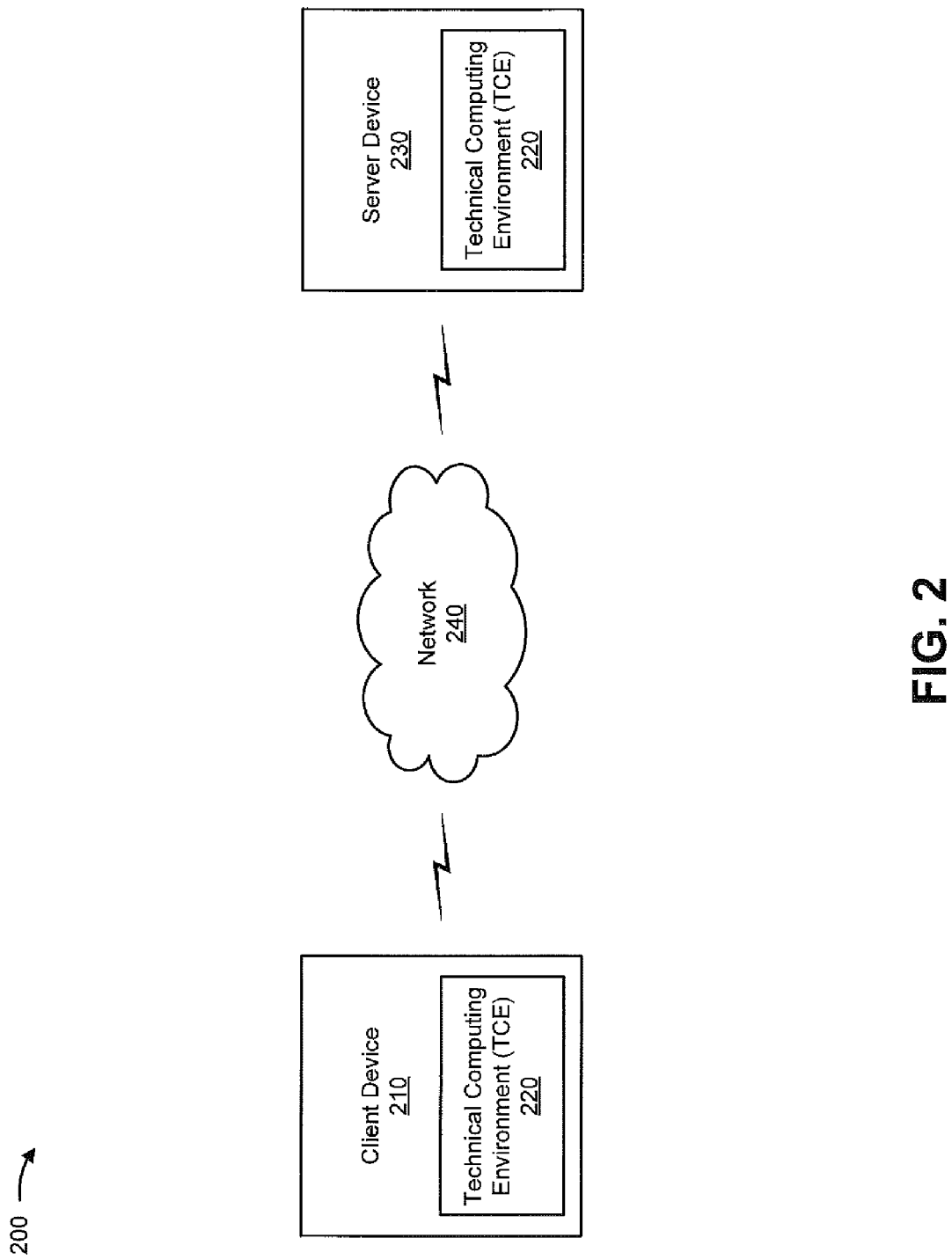
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, evaluating, and/or providing program code and/or information associated with program code (e.g., a result of evaluating program code, information associated with an evaluation trigger, etc.). For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may use an evaluation trigger to determine when to evaluate program code and/or when to provide a result of evaluating the program code. Client device 210 may evaluate program code by, for example, executing the program code, determining an error associated with the program code (e.g., by validating the program code, debugging the program code, etc.), determining information associated with the program code (e.g., determining help information associated with the program code), or the like. In some implementations, client device 210 may receive information from and/or transmit information to server device 230 (e.g., program code and/or information associated with program code).

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; Vis-Sim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include, for example, a user interface that provides a code editor portion that permits a user to input program code (e.g., textual program code, graphical program code, etc.). Additionally, or alternatively, TCE 220 may include a user interface that provides a code evaluation portion that provides results corresponding to program code displayed in the code editor portion. TCE 220 may provide one or more correspondence indicators that indicate a correspondence between different portions of program code and respective results associated with the different portions of program code. TCE 220 may permit a user to input one or more configuration parameters that may control, for example, a manner in which a result is displayed and/or provided, a manner in which program code is displayed and/or provided, a manner in which a correspondence indicator is displayed and/or provided, a manner in which an evaluation trigger controls evaluation of program code and/or display of results, or the like.

Server device 230 may include one or more devices capable of receiving, generating, storing, evaluating, and/or providing program code and/or information associated with program code. For example, server device 230 may include a computing device, such as a server, a desktop computer, a laptop computer, a tablet computer, a handheld computer, a mobile device, or a similar device. In some implementations, server device 230 may host TCE 220. In some implementations, client device 210 may be used to access one or more TCEs 220 running on one or more server devices 230. For example, multiple server devices 230 may be used to evaluate program code (e.g., serially or in parallel) and may provide respective results of evaluating the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution).

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
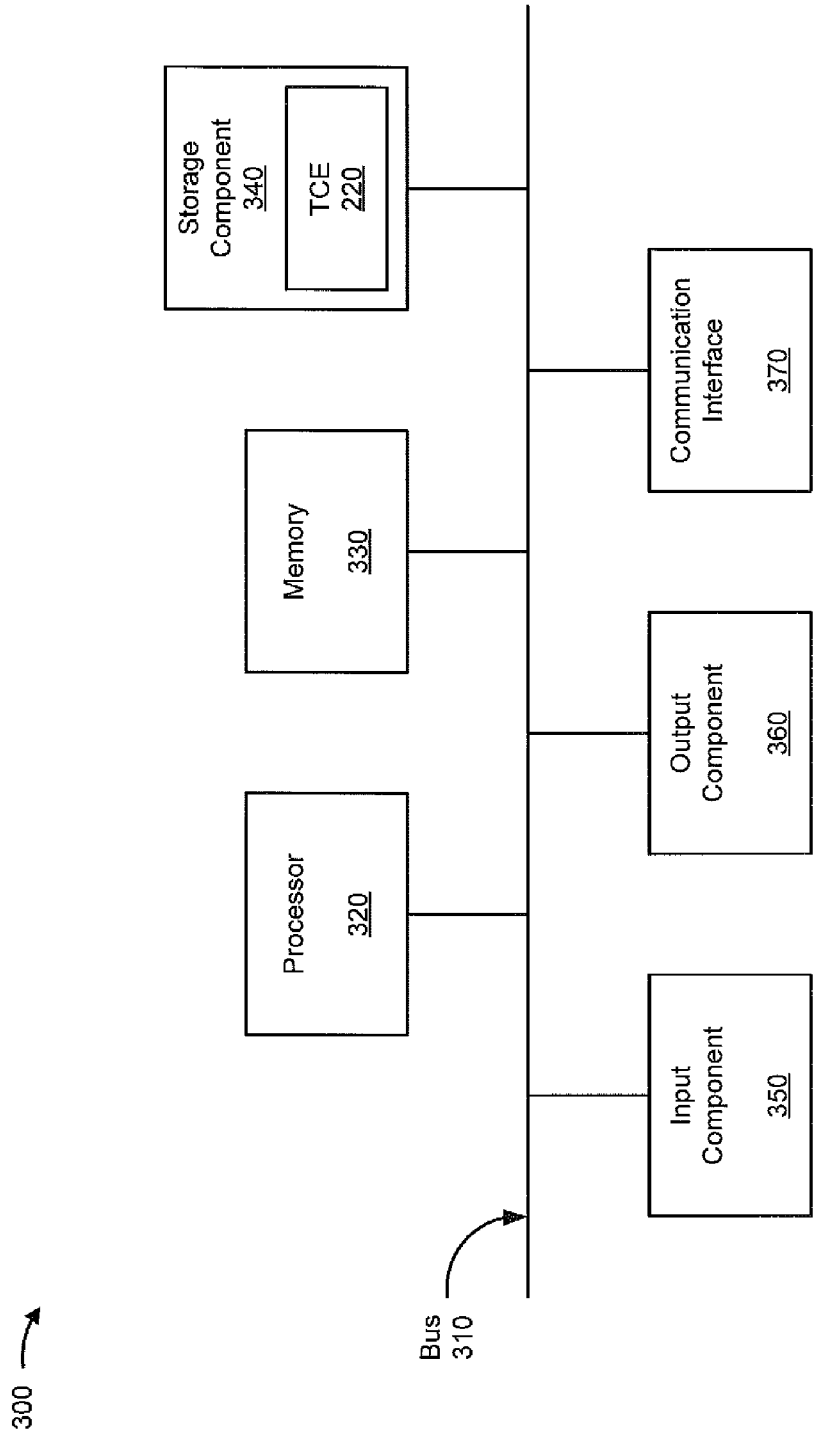
FIG. 3 is a diagram of example components of one or more devices of FIG. 2.

FIG. 3 is a diagram of example components of a device 300, which may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), an Arduino microcontroller, etc.) that interprets and/or executes instructions (e.g., according to an instruction set architecture, such as ARM, x86, etc.), and/or that is designed to implement one or more computing tasks. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform one or more processes described herein. Device 300 may perform these processes in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
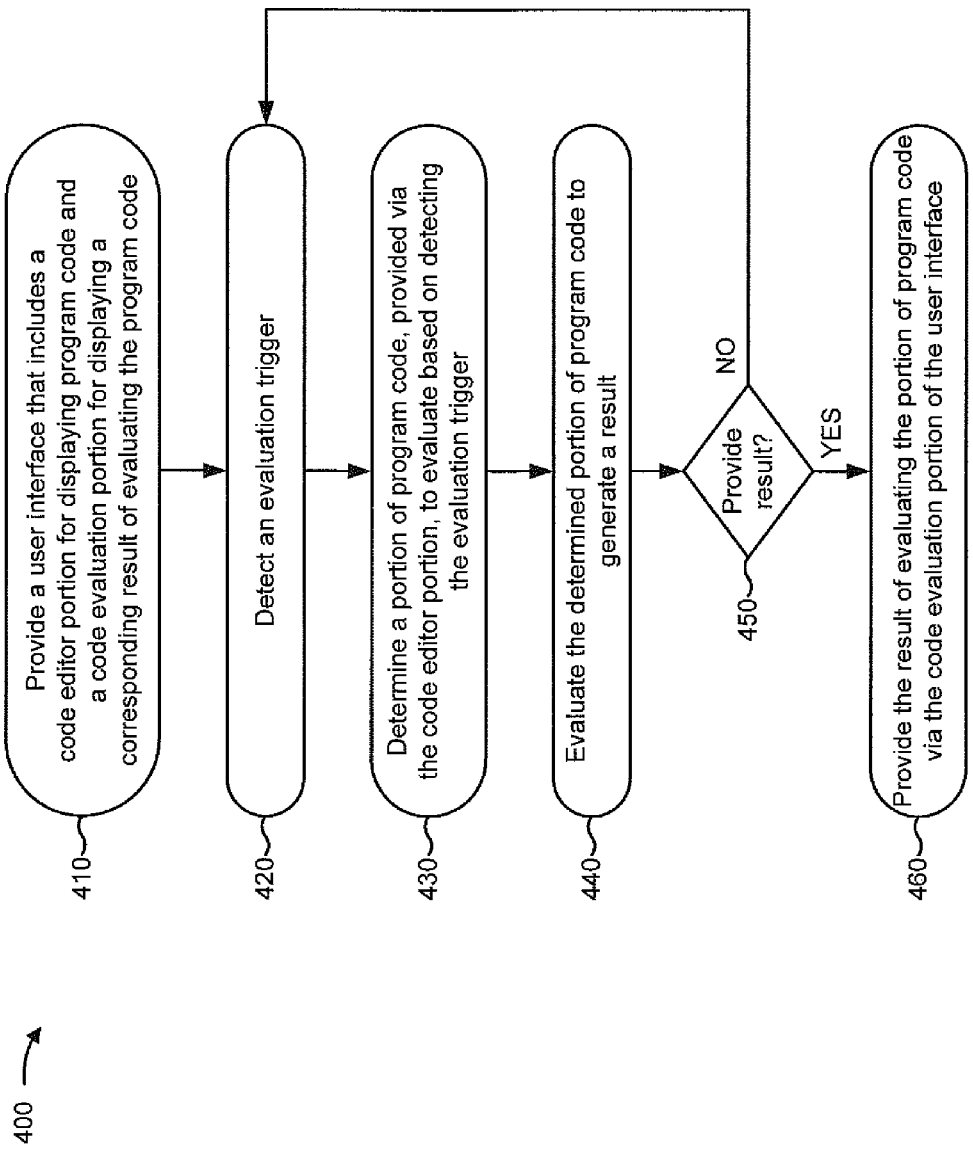
FIG. 4 is a flow chart of an example process for determining when to evaluate program code and provide results in a live evaluation programming environment.

FIG. 4 is a flow chart of an example process 400 for determining when to evaluate program code and provide results in a live evaluation programming environment. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include providing a user interface that includes a code editor portion for displaying program code and a code evaluation portion for displaying a corresponding result of evaluating the program code (block 410). For example, client device 210 may provide, via TCE 220, a user interface that includes a code editor portion (e.g., a code editor window) for displaying program code, and that further includes a code evaluation portion (e.g., a code evaluation window) for displaying a result of evaluating the program code. In some implementations, client device 210 may provide multiple portions of program code via the code editor portion of the user interface, and may provide multiple corresponding results via the code evaluation portion of the user interface.

In some implementations, client device 210 may receive (e.g., based on user input) an indication to display program code and a corresponding result of evaluating the program code, and may provide the user interface with the code editor portion and the code evaluation portion based on receiving the indication. Client device 210 may receive the indication based on a user interaction with a user interface of TCE 220, in some implementations. For example, a user may interact with an input mechanism (e.g., a menu item, a button, etc.) to provide the indication to client device 210.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like.

In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may correspond to a function, a script, an object, etc.

Client device 210 may concurrently provide both the code editor portion and the code evaluation portion via the user interface (e.g., both portions may be displayed on the user interface at the same time). In some implementations, client device 210 may provide the code editor portion and the code evaluation portion side-by-side, so as to convey a correspondence between a result, displayed in the code evaluation portion, and program code, displayed in the code editor portion, used to generate the result. Additionally, or alternatively, client device 210 may provide the code editor portion and the code evaluation portion in another manner (e.g., top to bottom).

As further shown in FIG. 4, process 400 may include detecting an evaluation trigger (block 420). For example, client device 210 may detect an evaluation trigger that causes client device 210 to evaluate a portion of program code (e.g., provided via the code editor window) and/or to provide a result of evaluating the portion of program code (e.g., in the code evaluation window). A portion of program code (sometimes referred to herein as a program code portion) may refer to a portion of a program, such as one or more lines of program code (e.g., sequential or non-sequential lines), a string of one or more characters of program code, a set of strings of program code, one or more blocks of program code, a function, a method, a script, an object, or the like.

In some implementations, client device 210 may detect the evaluation trigger by receiving explicit user input indicating that a portion of program code is to be evaluated (e.g., based on user interaction with an input mechanism, such as a button, a menu item, a link, or the like, based on detecting a mouse click, etc.). Additionally, or alternatively, client device 210 may detect the evaluation trigger by receiving an indication that the user has finished inputting, modifying, and/or deleting a program code portion. For example, the user may navigate away from an unevaluated program code portion and/or may navigate to a different program code portion (e.g., different from the unevaluated portion), such as by inputting a carriage return (e.g., via an "Enter" or "Return" key on a keyboard) to move a cursor to a different program code portion (e.g., a new line), clicking on a different program code portion (e.g., using a mouse, a gesture, etc.), scrolling the unevaluated program code portion out of a display portion of a user interface (e.g., the code editor window), or the like. Additionally, or alternatively, client device 210 may detect the evaluation trigger by using an eye tracking device (e.g., a camera) to determine that the user has looked away from client device 210, the code editor window, a portion of program code (e.g., a portion being input and/or edited, etc.).

As another example, client device 210 may detect the evaluation trigger by receiving user input of one or more characters that indicate that the user has finished inputting, modifying, and/or deleting a program code portion. For example, the user may input a right parenthesis (e.g., ")"), a right bracket (e.g., "]"), a right brace (e.g., "}"), an END statement (e.g., "end", "endif", etc.), or the like, to indicate that the user has finished inputting and/or modifying a program code portion (e.g., a function, a method, a conditional statement, a loop, etc.). As another example, the user may input a semicolon (e.g., ";") to indicate that the user has finished inputting a line of program code, and client device 210 may detect the evaluation trigger based on receiving the semicolon as input. However, in some implementations, a semicolon may indicate that the user wishes to suppress a result of evaluating a line of code that ends with a semicolon, and client device 210 may not evaluate code and/or provide a result of evaluating the code when the user inputs a semicolon.

Client device 210 may detect the evaluation trigger by detecting user input of a function or another pre-defined portion of program code (e.g., by recognizing a function name), in some implementations. Additionally, or alternatively, client device 210 may detect the evaluation trigger by determining that required input arguments for the function have been input, and/or by determining that the input arguments are valid.

Client device 210 may detect the evaluation trigger by detecting a pause in input, in some implementations. For example, a user may stop providing input (e.g., may stop typing program code), and client device 210 may determine that a threshold amount of time has elapsed since the user stopped providing input. Based on determining that the amount of time satisfies the threshold, client device 210 may trigger evaluation of a program code portion (e.g., a program code portion where the user last provided input).

In some implementations, client device 210 may detect the evaluation trigger based on determining whether there are any errors associated with an unevaluated program code portion. For example, if client device 210 determines that a particular program code portion includes an error (e.g., a syntax error, a compilation error, a run-time error, etc.), then client device 210 may not evaluate and/or provide a result of evaluating the particular program code portion. As another example, if client device 210 evaluates a portion of program code and determines that there are no errors associated with the portion of program code, then client device 210 may provide a result of evaluating the portion of program code. Additionally, or alternatively, client device 210 may use different evaluation triggers for program code portions that include errors and program code portions that do not include errors. For example, client device 210 may trigger evaluation of an error-free line of code after a threshold amount of time has passed and the user has not navigated to a different line of code, but may require the user to navigate to a different line of code to trigger evaluation of an erroneous line of code (e.g., a line of code that includes an error).

In some implementations, client device 210 may detect the evaluation trigger based on determining a type of input code. For example, a document may include rich text code and plain text code. Client device 210 may trigger evaluation of only rich text code, only plain text code (e.g., when several portions of plain text code are input sequentially), or a combination of rich text code and plain text code.

Client device 210 may use a combination of multiple evaluation triggers described herein to determine when to evaluate program code, in some implementations. Additionally, or alternatively, different evaluation triggers may be assigned different values and/or weights, and client device 210 may combine the different values and/or weights based on a state of an evaluation trigger (e.g., a TRUE/FALSE state, a quantity, an amount of time, etc.) to generate an evaluation trigger value. Client device 210 may compare the evaluation trigger value to a threshold value, and may determine whether to trigger the evaluation based on whether the evaluation trigger value satisfies the threshold value. In some implementations, client device 210 may receive user input to set the values, the weights, and/or the threshold value.

In some implementations, client device 210 may determine not to trigger code evaluation based on particular program code. For example, a user may input a comment (e.g., by inputting a particular set of characters that indicates a comment, such as //, ?, etc.) into the code editor window. Client device 210 may detect the comment (e.g., by detecting the particular set of characters), and may prevent code evaluation based on detecting the comment. As another example, client device 210 may prevent code evaluation based on detecting that a blank line has been inserted into the code, that a blank space has been inserted into the code (e.g., in a portion of the program not affected by the blank space, such as at the beginning, end, or in between language constructs), or the like.

While the evaluation trigger is described in some cases herein as triggering an evaluation of program code, in some implementations, the evaluation trigger may trigger display of a result rather than triggering evaluation of program code. In other words, client device 210 may evaluate a portion of program code when the evaluation trigger has not been detected, but may not provide a result of evaluating the portion of program code until the evaluation trigger has been detected. Thus, for example, client device 210 may evaluate program code more frequently than results of the evaluation are shown.

As further shown in FIG. 4, process 400 may include determining a portion of program code, provided via the code editor portion, to evaluate based on detecting the evaluation trigger (block 430). For example, client device 210 may determine one or more portions of program code, provided via the code editor window, to be evaluated. Client device 210 may determine the one or more program code portions based on detecting the evaluation trigger.

Client device 210 may determine to evaluate a portion of program code that has not yet been evaluated (e.g., an unevaluated portion of program code), in some implementations. The unevaluated portion of program code may include a new portion of program code input by a user, a modified portion of program code (e.g., a previously-evaluated portion of code that has been modified by a user), or the like. For example, the user may input a new, unevaluated line of program code, and may navigate to a different line of code. When the user navigates to the different line of code, client device 210 may evaluate the new, unevaluated line of program code. As an example, when a user inputs new code, client device 210 may evaluate only the new code rather than evaluating all of the code and/or portions of the code other than the new code.

Additionally, or alternatively, client device 210 may determine one or more dependent portions of program code that depend from the new and/or modified portion of program code or from which the new and/or modified portion of program code depends. Client device 210 may determine to evaluate the dependent portions of program code. For example, a dependent portion of code may share a same variable as a new and/or modified portion of code, may share a same function as a new and/or modified portion of code, may depend on an output from a new and/or modified portion of code (e.g., an output from the new or modified portion of code that is provided as an input to the dependent portion of code), may generate a result that has changed based on the new and/or modified portion of program code, or the like. As an example, if client device 210 detects a change to a portion of program code that is unrelated to other portions of program code (e.g., that is independent of the other portions of program code), then client device 210 may trigger evaluation of only the changed portion of program code.

Client device 210 may determine that a portion of program code has been deleted, in some implementations. In this case, client device 210 may delete a corresponding result of evaluating the deleted program code (e.g., may delete the result from the code evaluation window). Alternatively, client device 210 may maintain the corresponding result and/or may mark the corresponding result as being associated with a portion of program code that has been deleted. Additionally, or alternatively, client device 210 may determine to evaluate one or more dependent portions of program code that depend from the deleted portion of program code (e.g., with results that have changed based on deleting the portion of program code).

If a new, modified, or deleted portion of program code is associated with a block of code (e.g., a function, a loop, a conditional statement, a cell, etc.), then client device 210 may determine that the block of code is to be evaluated based on detecting an evaluation trigger associated with the new, modified, or deleted portion of program code.

As further shown in FIG. 4, process 400 may include evaluating the determined portion of program code to generate a result (block 440). For example, client device 210 may evaluate the determined portion of program code. Client device 210 may determine a result based on the evaluation. A result may correspond to a particular portion of evaluated program code. Additionally, or alternatively, client device 210 may cause the program code to be evaluated (e.g., by client device 210 and/or server device 230).

Client device 210 may evaluate the program code based on one or more selected evaluation modes. Example evaluation modes include an execute mode, a debug mode, and a help mode. In some implementations (e.g., when the execute mode is specified), client device 210 may evaluate the program code by executing the program code. Additionally, or alternatively (e.g., when the debug mode is specified), client device 210 may evaluate the program code by determining whether the program code is associated with one or more errors (e.g., by determining whether the portion of program code fails to execute and/or executes incorrectly). Additionally, or alternatively (e.g., when the help mode is specified), client device 210 may evaluate the program code by determining to provide help information associated with the program code.

In some implementations, client device 210 may provide information identifying one or more portions of program code to one or more server devices 230 for evaluation (e.g., serially or in parallel). For example, client device 210 may run a browser for receiving input to be provided to server device(s) 230 and/or for displaying information received from server device(s) 230. Server device(s) 230 may evaluate the portion(s) of program code, and may provide one or more respective results of evaluating the portion(s) of program code to client device 210. Client device 210 and/or server device 230 may break the code into portions (e.g., based on the dependencies), and may evaluate different portions of the code serially and/or in parallel.

In some implementations, client device 210 may interact with a scheduler (e.g., local to client device 210 or remote from client device 210) that schedules one or more portions of program code for execution by one or more remote processors. The remote processors may be included in one or more server devices 230. The scheduler may determine a quantity of processors to use to execute program code based on the complexity of the program code and/or a quantity of program code portions that are to be executed (e.g., a quantity of program code portions that a user identifies or selects for execution).

As further shown in FIG. 4, process 400 may include determining whether to provide the result (block 450). For example, client device 210 may determine whether to provide the result based on whether a display trigger is satisfied. A display trigger may include any of the conditions described elsewhere herein with respect to an evaluation trigger.

In some implementations, client device 210 may provide a result by replacing an old result with a new result (e.g., based on a modification to previously evaluated program code). In this case, client device 210 may wait to replace the old result until the new result has been generated (e.g., may not remove the old result from the display portion until the new result is ready to display).

If the result is not to be provided (block 450—NO), then process 400 may include returning to block 420 to wait for detection of an evaluation trigger. For example, client device 210 may determine that a result, generated by evaluating a portion of program code, is not to be provided via the code evaluation window. In this case, client device 210 may prevent the result from being provided, and may wait until another evaluation is triggered.

If the result is to be provided (block 450—YES), then process 400 may include providing the result of evaluating the portion of program code via the code evaluation portion of the user interface (block 460). For example, client device 210 may provide the result via the code evaluation portion of the user interface.

Client device 210 may evaluate multiple portions of program code (e.g., in series or in parallel), and may provide one or more respective results corresponding to the multiple portions of evaluated program code, in some implementations. For example, client device 210 may evaluate a first portion of program code (e.g., provided via the code editor window), may provide a first result corresponding to the first portion of program code (e.g., via the code evaluation window), may evaluate a second portion of program code (e.g., provided via the code editor window), may provide a second result corresponding to the second portion of program code (e.g., via the code evaluation window), etc.

In some implementations, client device 210 may provide the program code and the program code evaluation results in separate windows and/or separate portions of the user interface. For example, client device 210 may not provide the results in-line with the code. Client device 210 may not provide the results in between portions (e.g., lines) of program code, so that consecutive (e.g., adjacent) portions of program code are not interrupted by providing results in between the consecutive portions. For example, a group of program code portions may be provided together, and a group of results may be provided together, but the two groups may be provided separately, such that the program code portions and the results are not interlaced in the user interface (e.g., in the code editor window). In some implementations, client device 210 may provide an indication of a correspondence (e.g., a correspondence indicator) between the program code and the result of evaluating the program code (e.g., a program code evaluation result).

In some implementations, client device 210 may receive input to toggle between displaying one or more results side-by-side (e.g., side-by-side with the program code, such as via a separate window) or in-line (e.g., in-line with program code, such as in the same window). As an example, a user may identify one or more results to be provided in-line with program code, and client device 210 may provide the results in-line with corresponding program code (e.g., in the code editor window), where a result is provided immediately after program code used to generate the result. As another example, the user may identify one or more results to be provided side-by-side with program code (e.g., in the code evaluation window), and client device 210 may provide the results side-by-side with corresponding program code (e.g., as described elsewhere herein). In some implementations, client device 210 may differentiate program code from results provided in-line, such as by marking the program code and/or results in a different manner (e.g., highlighting the results, highlighting the code, etc.).

Client device 210 may provide a new result based on a new portion of program code being input by a user, in some implementations. In this case, client device 210 may use an animation, such as gradually fading in the new result, to provide the result for display. In some implementations, the new result may be positioned between other previously-generated results in the code evaluation window (e.g., when a line of program code is inserted between other lines of program code). In this case, client device 210 may gradually insert space between the previously-generated results (e.g., by moving the previously-generated results apart), and may insert the new result into the created space. In this way, a user's attention may not be diverted from a programming task (e.g., inputting program code) by a result that suddenly appears in the code evaluation window.

Client device 210 may provide a result based on a modification to a previously evaluated portion of program code, in some implementations. In this case, client device 210 may use an animation, such as gradually fading out an old result (e.g., corresponding to the previously evaluated program code) and fading in an updated result (e.g., corresponding to the modified program code), gradually morphing the old result to the updated result, or the like, to provide the updated result for display. In some implementations, client device 210 may detect a modification of program code, but may not have yet determined to evaluate the modified program code (e.g., may not have detected an evaluation trigger to evaluate the modified program code). In this case, client device 210 may obscure the old result (e.g., by graying out the old result, by marking the old result to indicate that corresponding program code has been modified, etc.) until an updated result is generated (e.g., based on detecting an evaluation trigger). When the updated result is generated, client device 210 may replace the old result with the updated result. In this way, a user's attention may not be diverted from a programming task (e.g., inputting program code) by a result that is suddenly replaced in the code evaluation window.

Client device 210 may remove an old result based on detecting a deletion of a portion of program code, in some implementations. In this case, client device 210 may use an animation, such as gradually fading out the old result, to remove the result from being displayed. In some implementations, the old result may be positioned between other previously-generated results in the code evaluation window (e.g., when a line of program code, positioned between other lines of program code, is deleted). In this case, client device 210 may gradually remove space between the previously-generated results (e.g., by moving the previously-generated results together) after removing the old result. In this way, a user's attention may not be diverted from a programming task (e.g., inputting program code) by a result that suddenly disappears in the code evaluation window.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
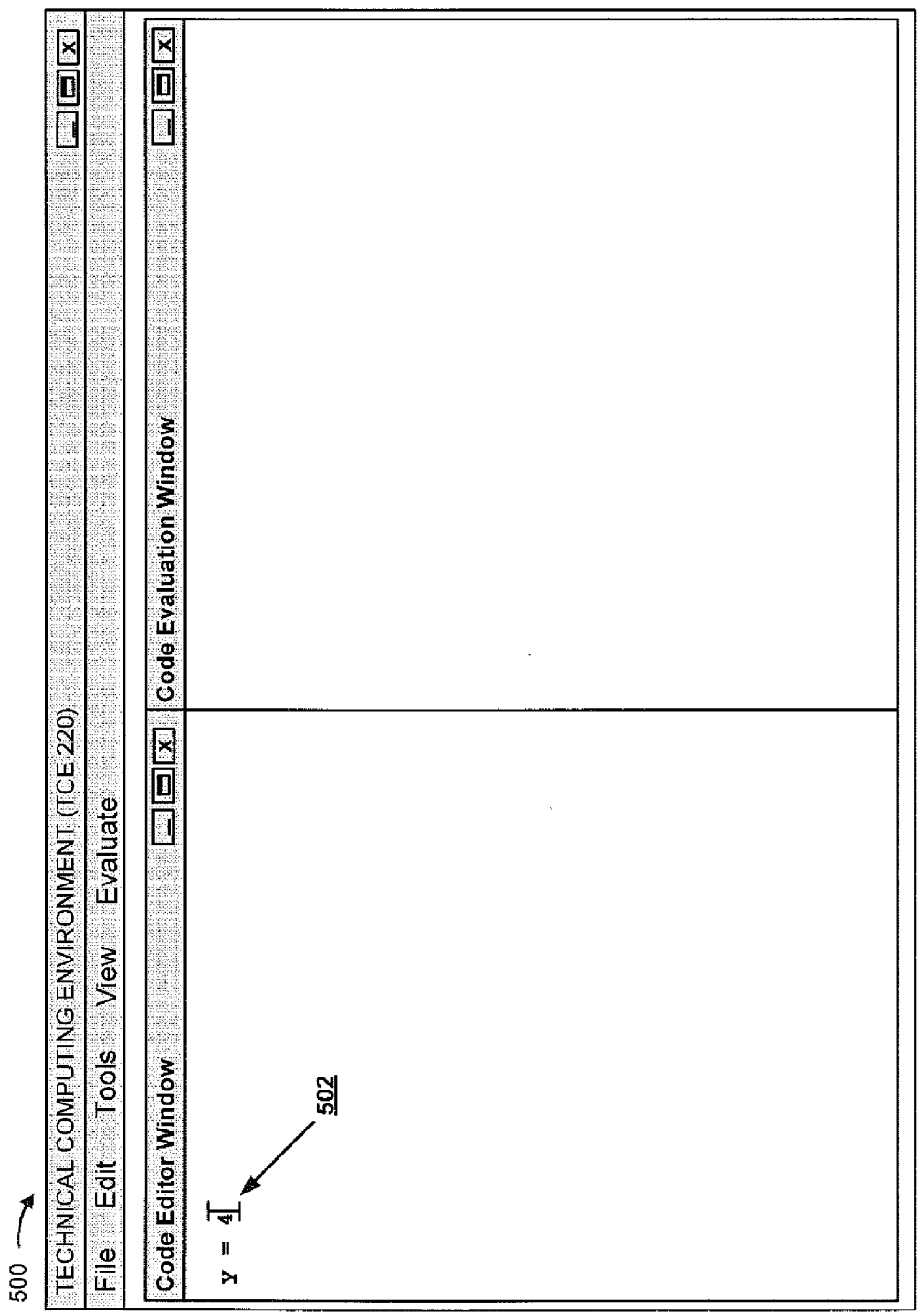
FIGS. 5A-5O are diagrams of an example implementation relating to the example process shown in FIG. 4.
Figure 5B:
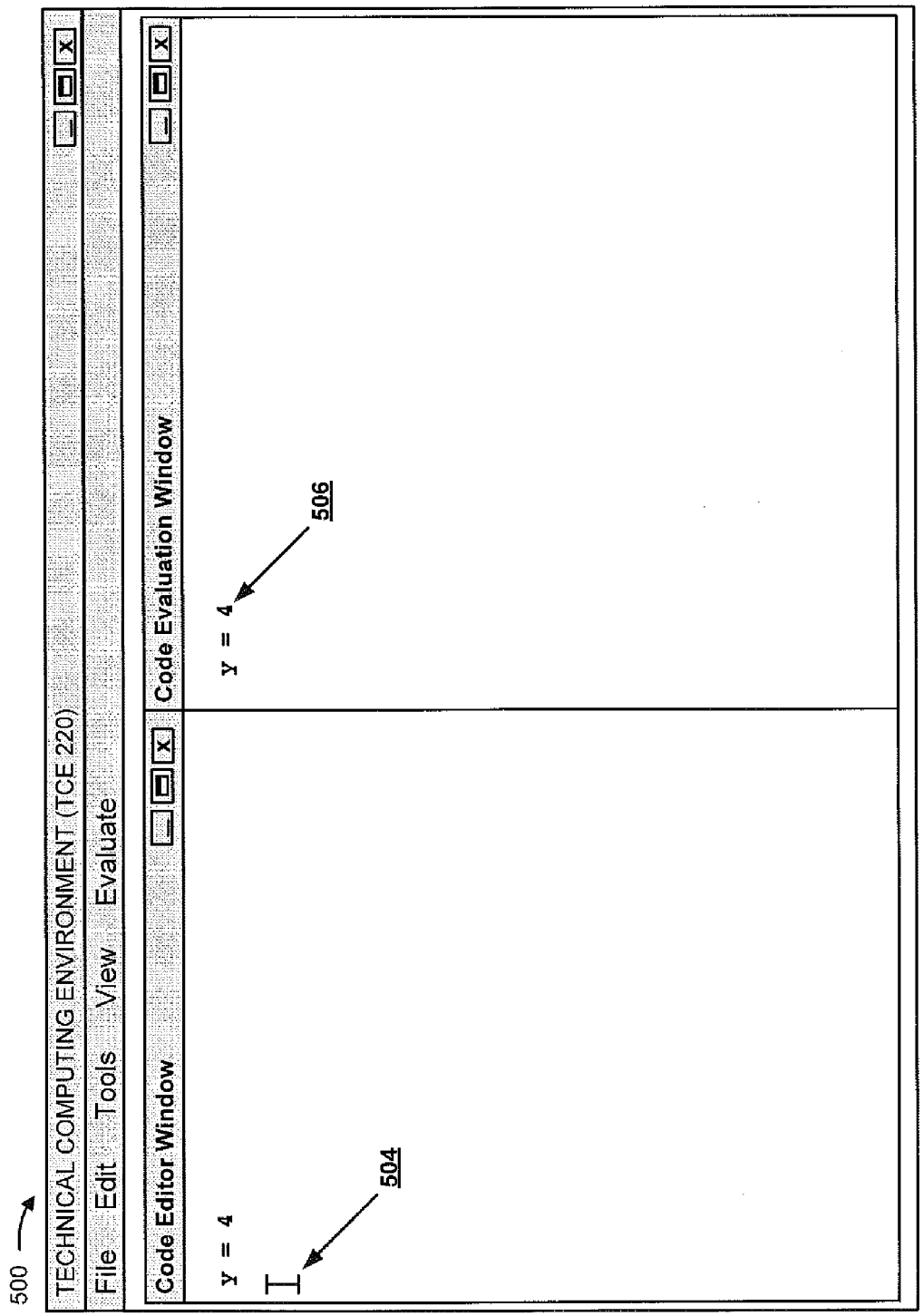
Figure 5C:
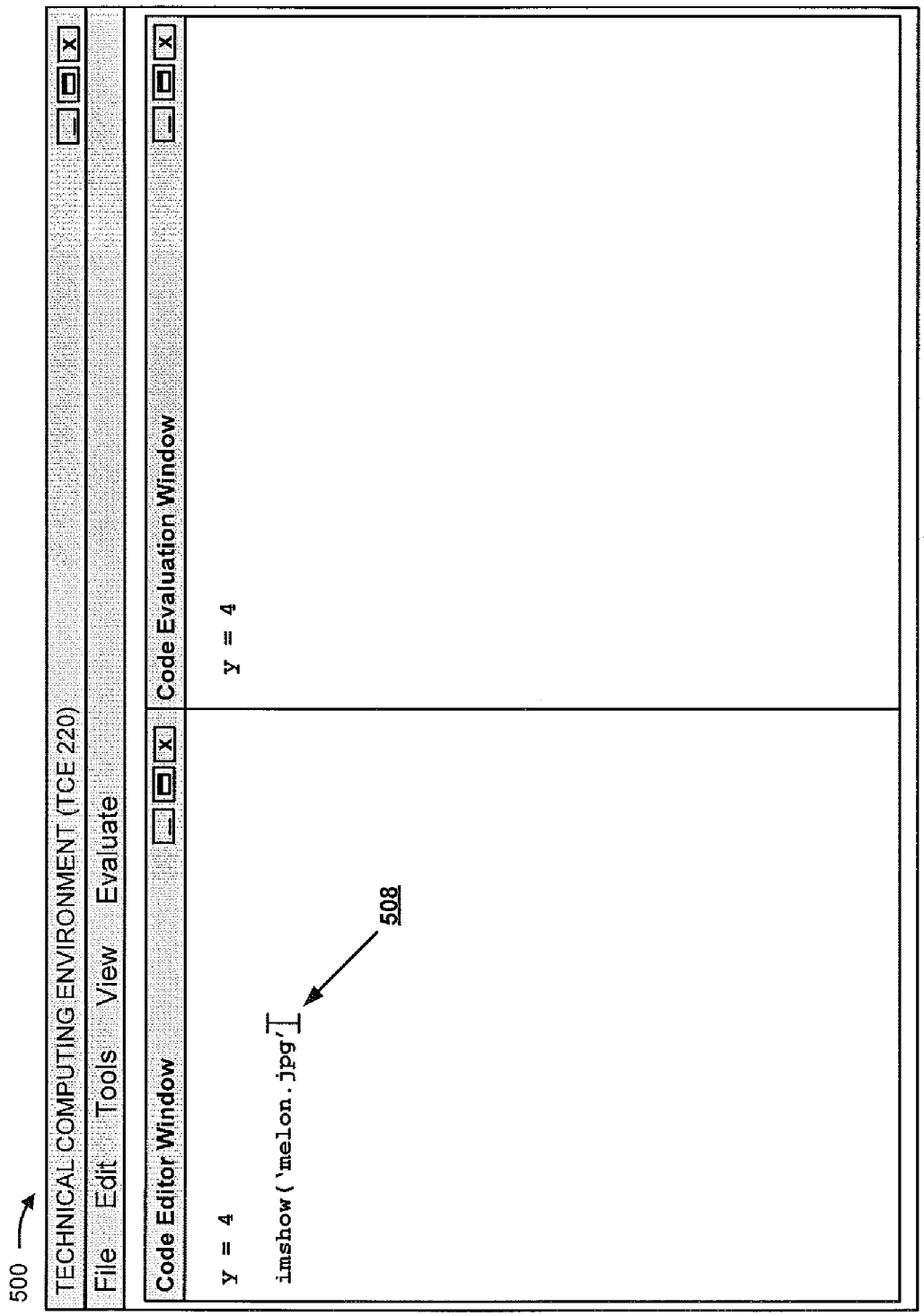
Figure 5D:
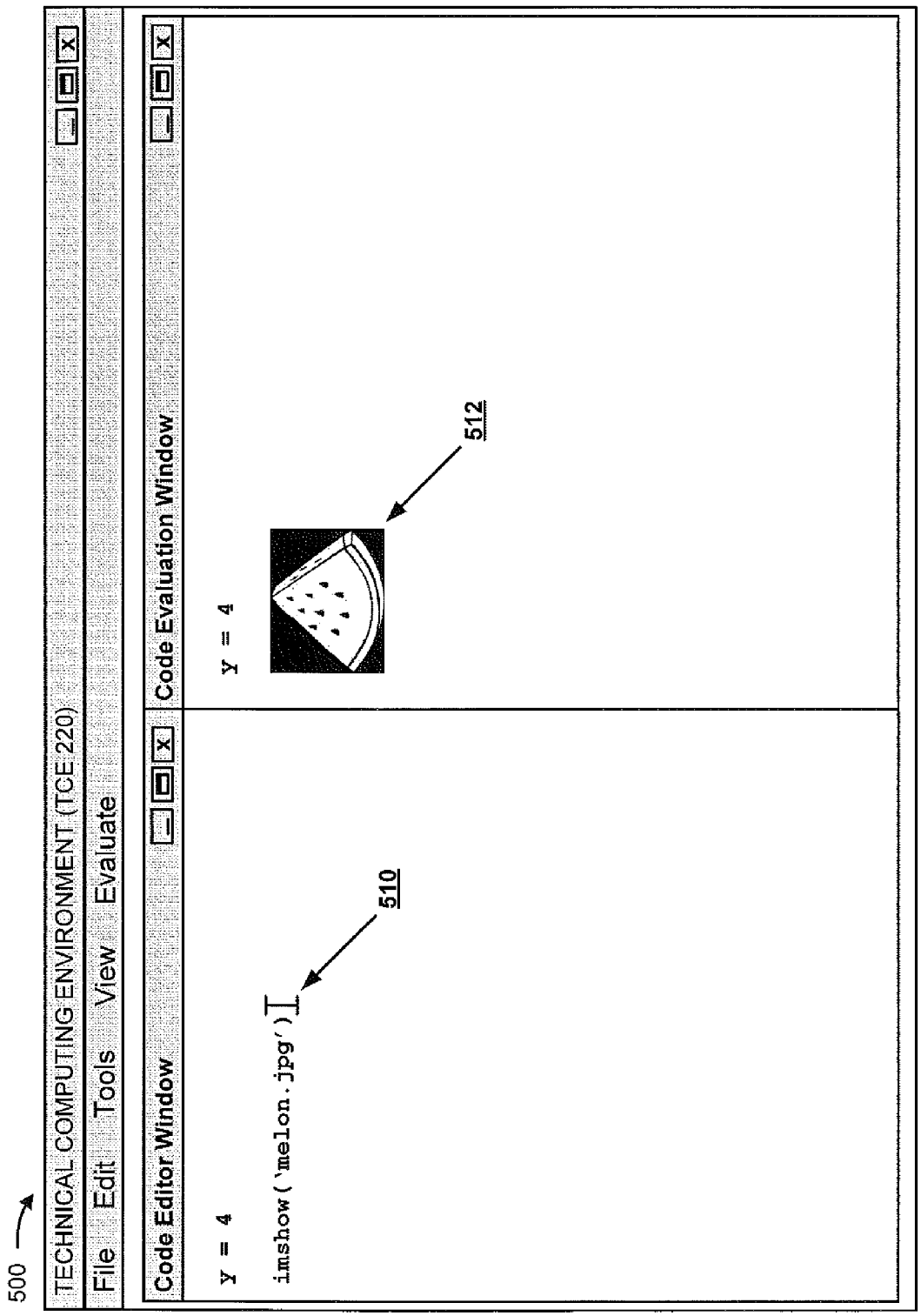
Figure 5E:
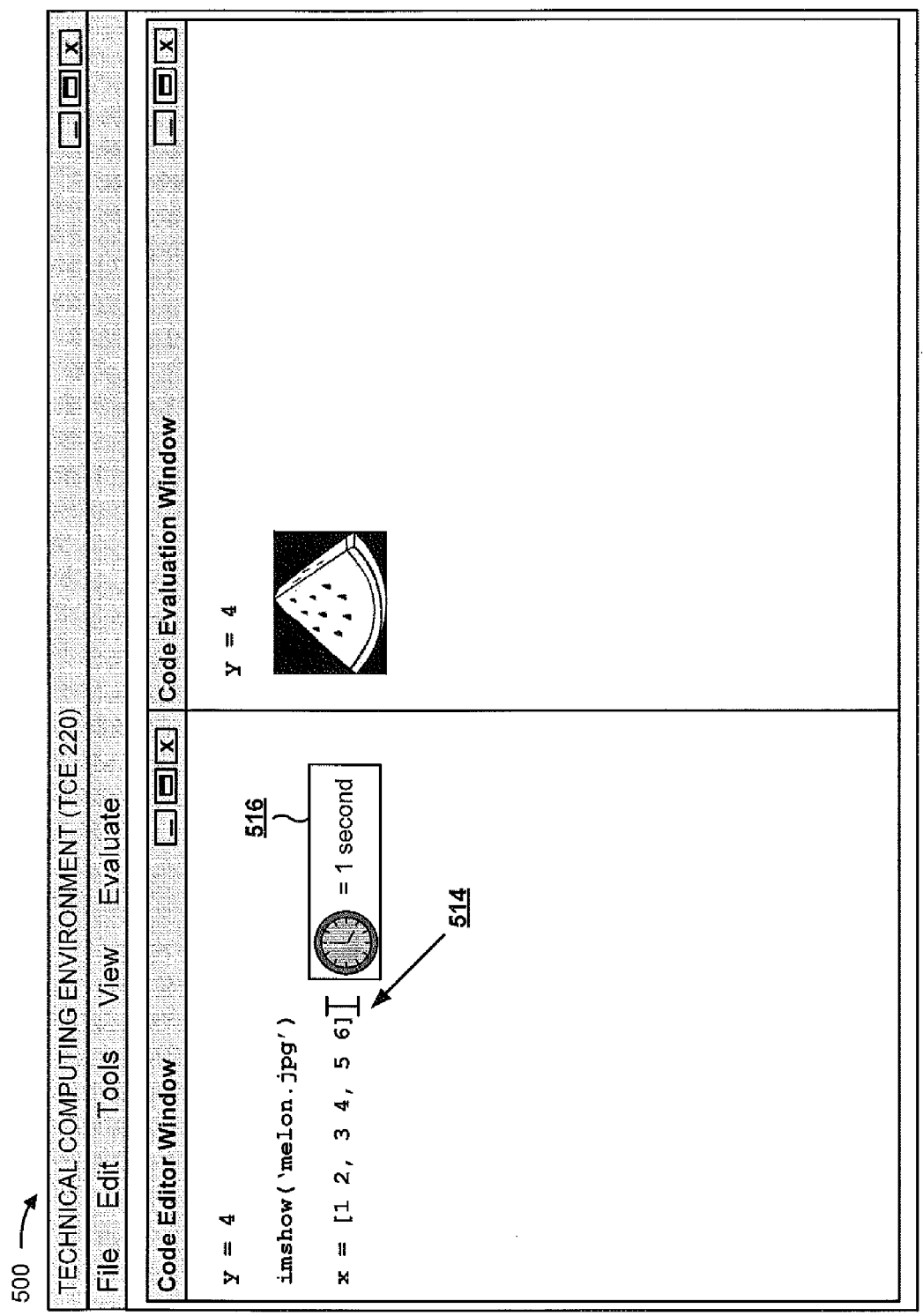
Figure 5F:
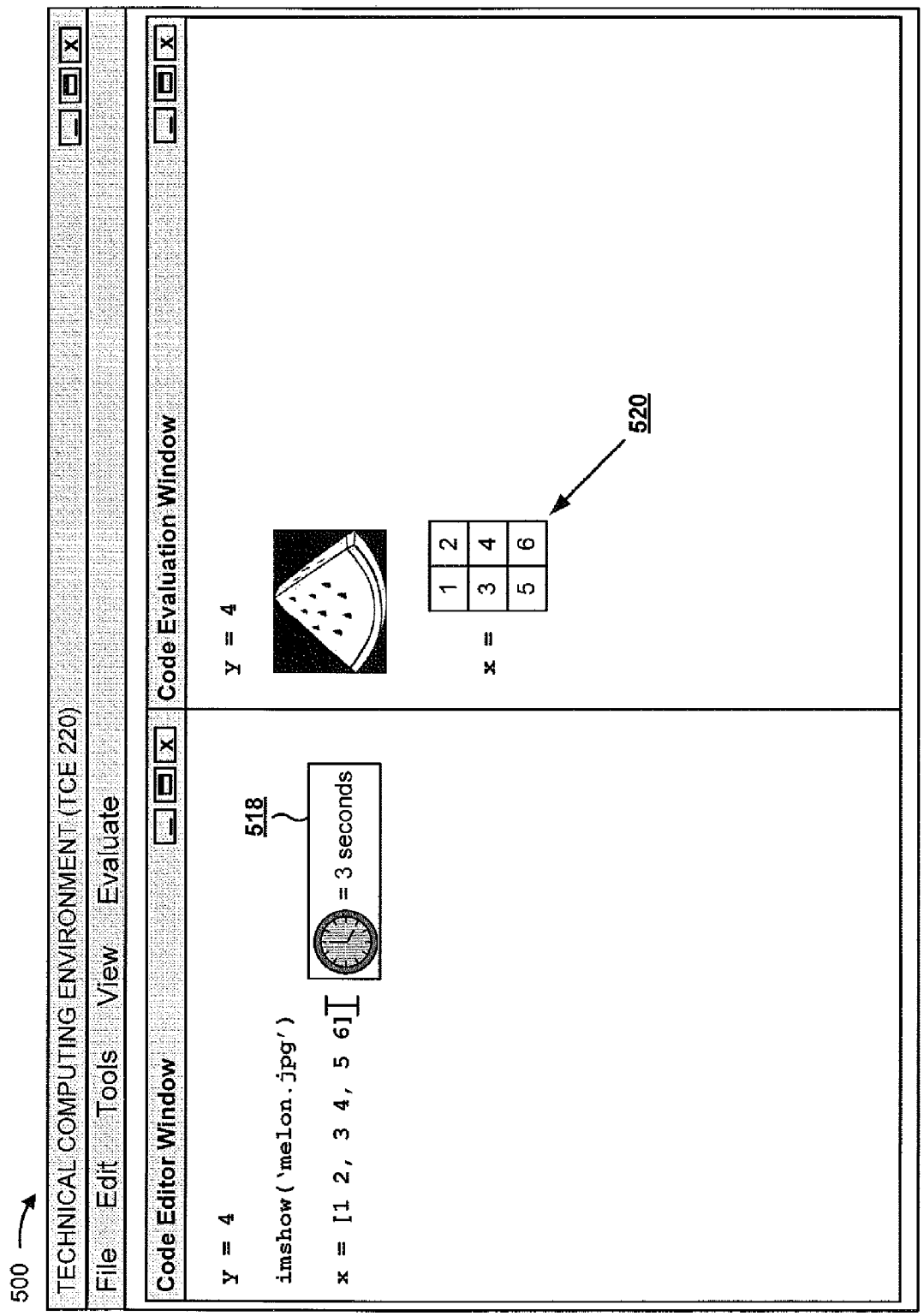
Figure 5G:
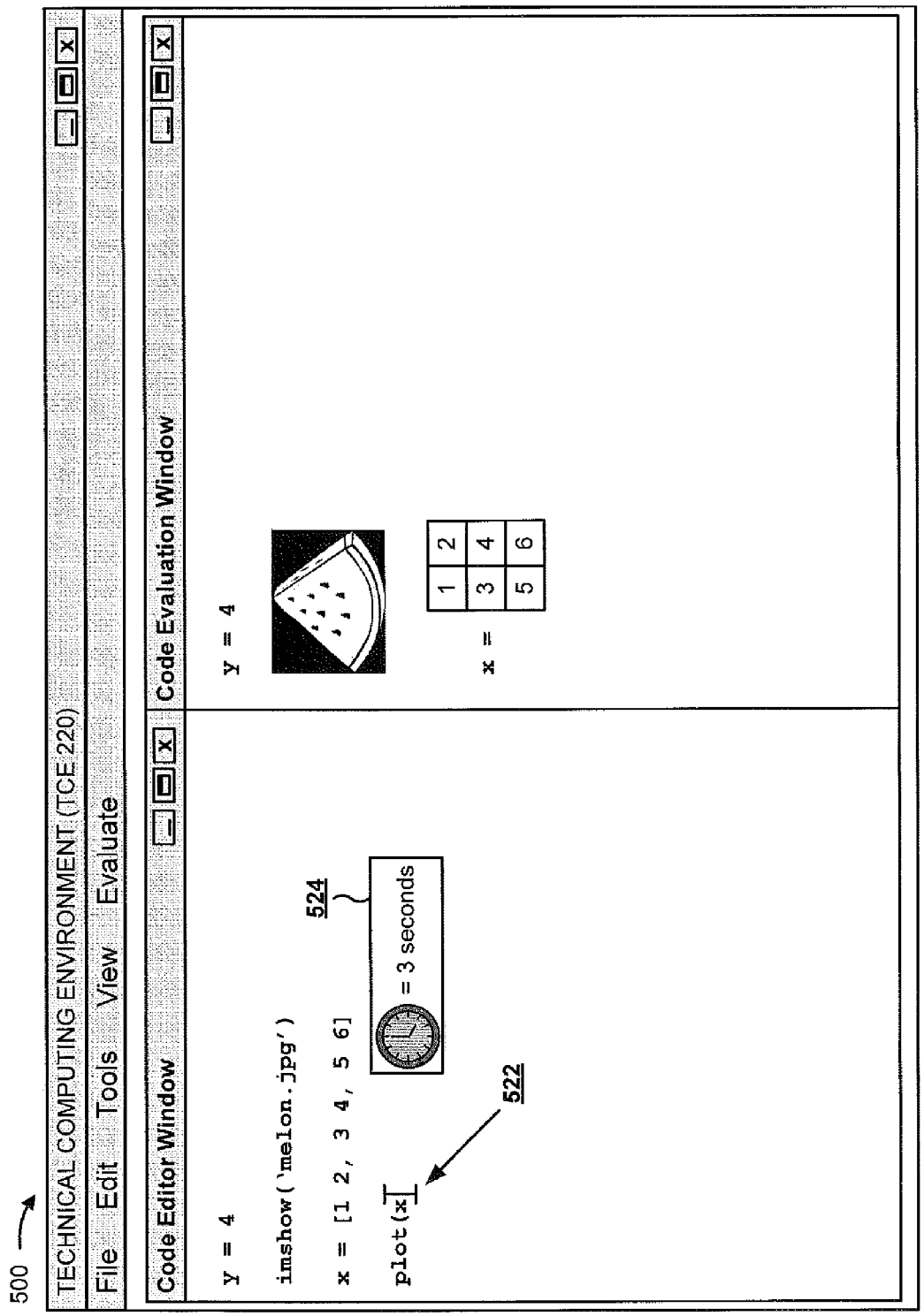
Figure 5H:
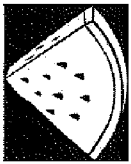
Figure 5I:
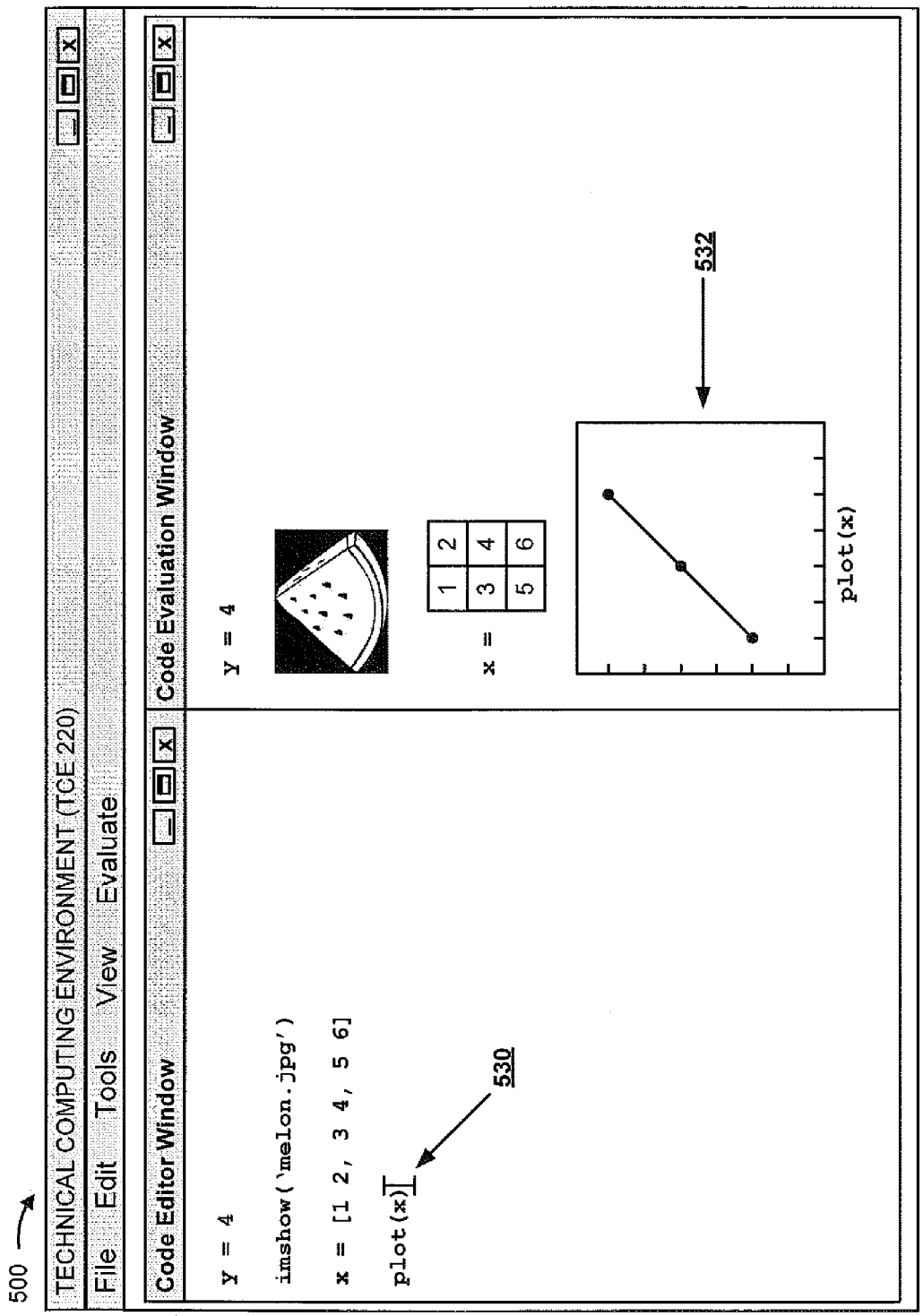
Figure 5J:
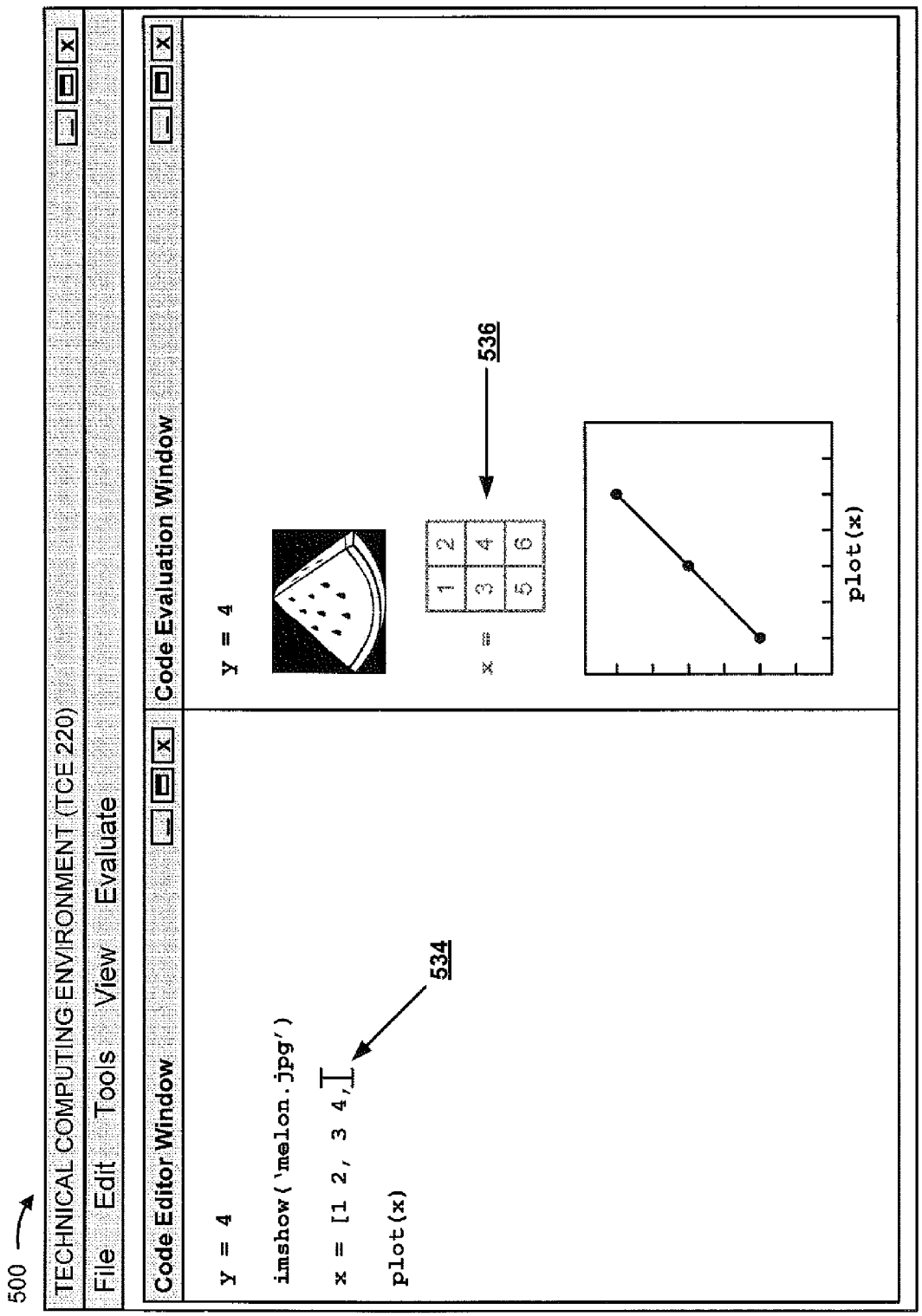
Figure 5K:
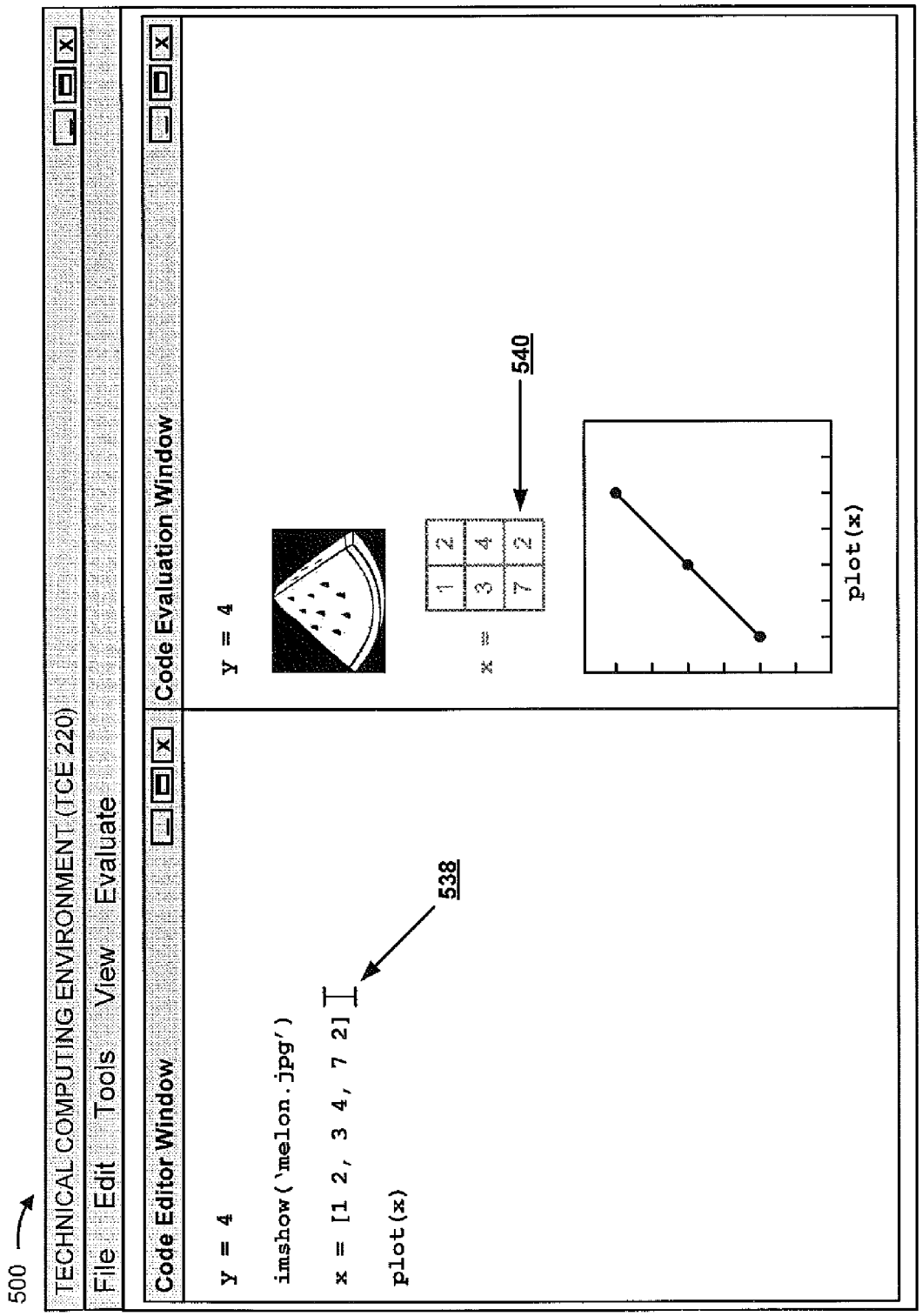
Figure 5L:
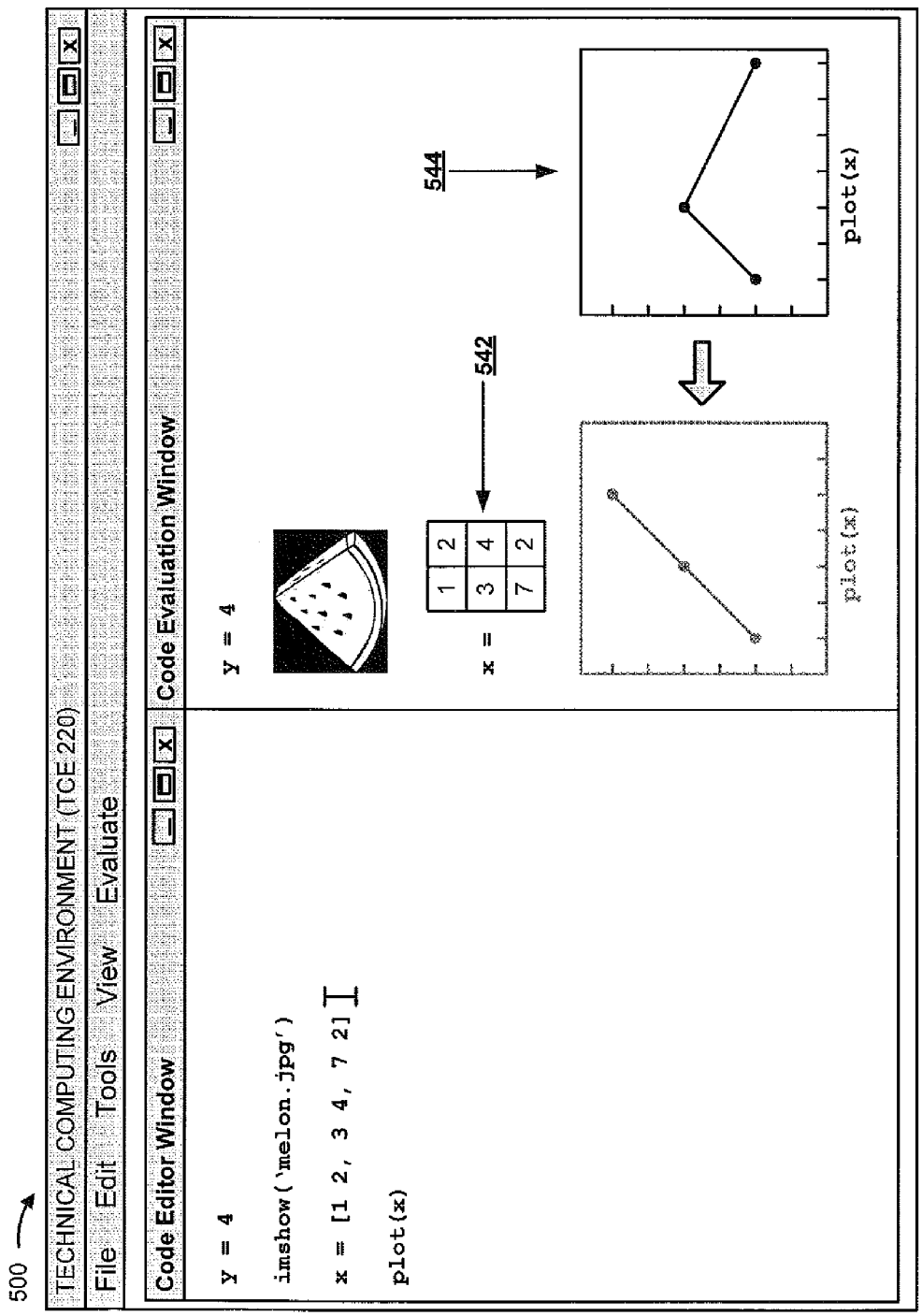
Figure 5M:
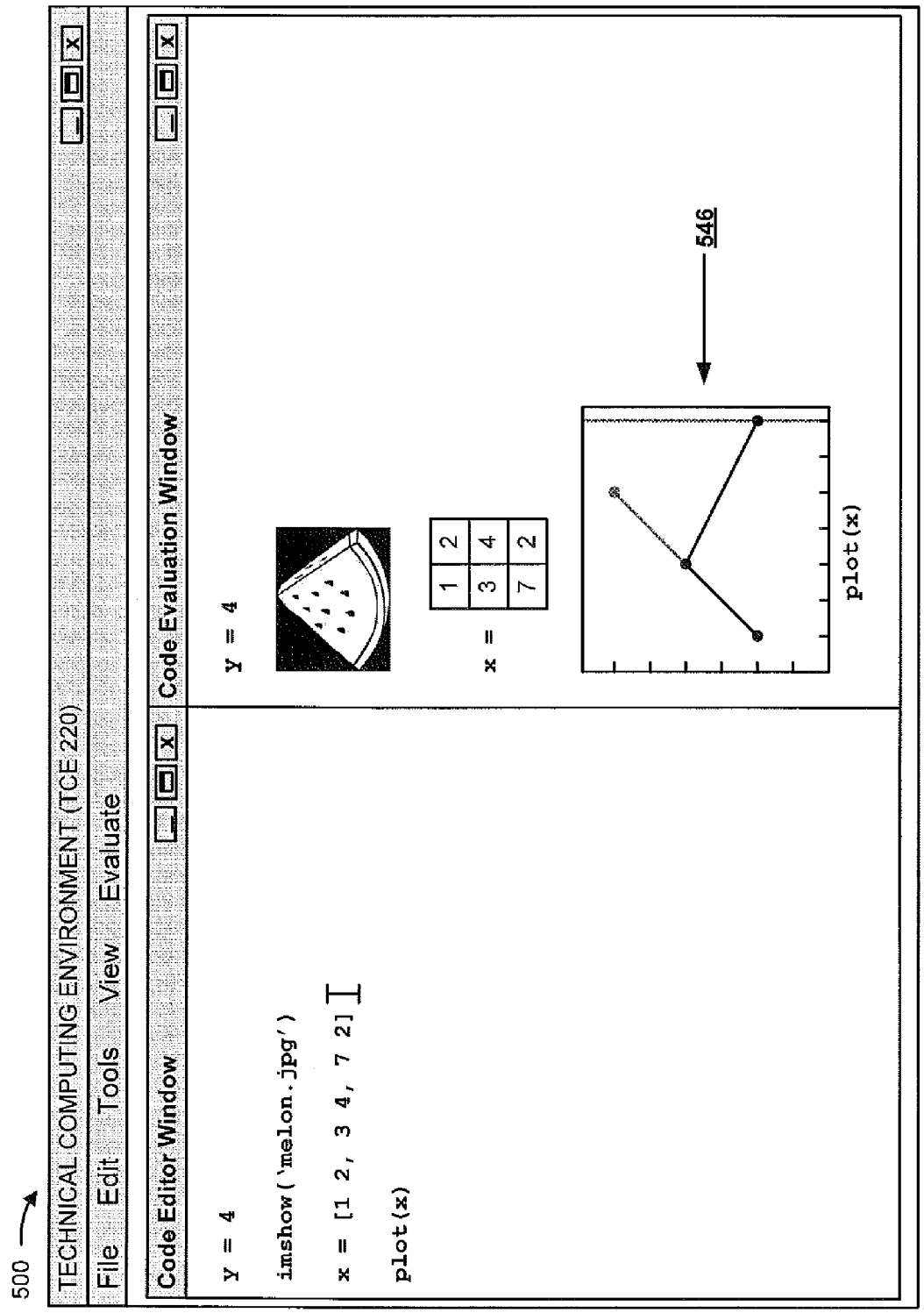
Figure 5N:
Figure 5O:
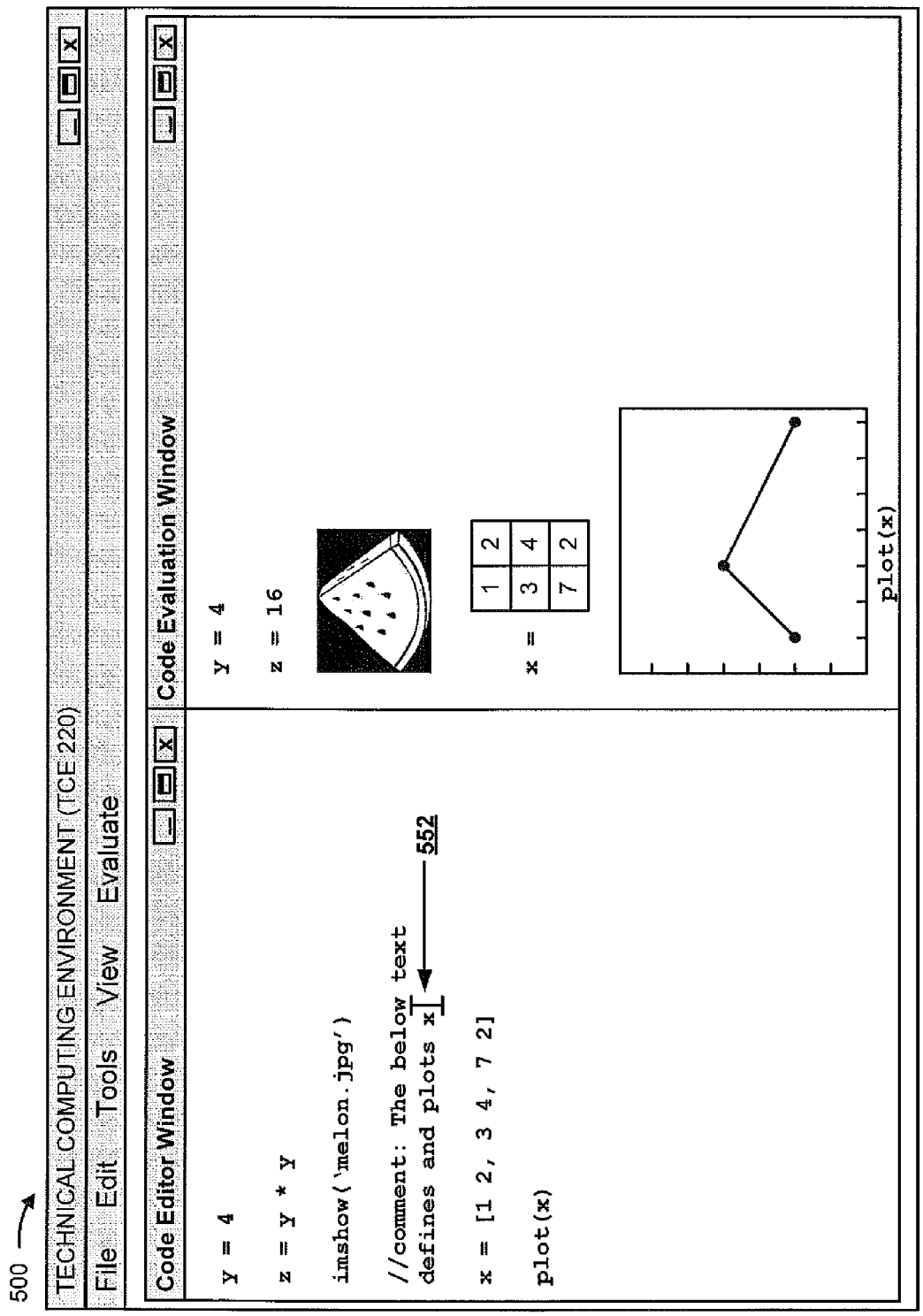

FIGS. 5A-5O are diagrams of an example implementation 500 relating to example process 400 shown in FIG. 4. FIGS. 5A-5O show examples of different evaluation triggers that cause client device 220 to evaluate program code and/or provide a result of evaluating program code.

As shown in FIG. 5A, assume that a user of client device 210 has input program code, shown as y=4, into a code editor window of TCE 220. As shown by reference number 502, assume that the user has not yet moved the cursor to a new line (e.g., has not provided an indication that the user has finished inputting the line of program code). As further shown in FIG. 5A, client device 210 has not yet provided a result of evaluating the line of program code because the user may input further program code that affects a result of the evaluation (e.g., y=420, y=4+a, etc.).

As shown in FIG. 5B, and by reference number 504, assume that the user moves the cursor to a new line (e.g., by pressing an "Enter" key on a keyboard). Based on this user interaction, client device 210 generates a result associated with the program code y=4, and provides the result via the code evaluation window, as shown by reference number 506. For example, client device 210 provides a current value of the variable y (e.g., y=4).

As shown in FIG. 5C, and by reference number 508, assume that the user has input a second line of program code, shown as imshow('melon.jpg', but that the user has not yet finished inputting the program code (e.g., by closing a parenthesis associated with the imshow function). Assume that client device 210 determines that the syntax of this second line of program code is incorrect (e.g., due to the missing parenthesis), and does not evaluate and/or provide a result of evaluating the second line of program code based on the incorrect syntax.

As shown in FIG. 5D, and by reference number 510, assume that the user inputs a right parenthesis to finish the imshow statement, and to create a syntactically correct line of program code. Based on this user interaction, client device 210 generates a result associated with the program code imshow('melon.jpg'), and provides the result via the code evaluation window, as shown by reference number

512. For example, client device 210 provides an image loaded from a memory location identified by melon.jpg.

As shown in FIG. 5E, and by reference number 514, assume that the user has input a third line of program code, shown as x=[1 2, 3 4, 5 6], and has kept the cursor on the third line of program code. Assume that this syntax is correct. As shown by reference number 516, assume that one second has elapsed since the user stopped typing (e.g., since the user input the right bracket,]). Further, assume that a value of three seconds was previously input as a threshold for evaluating code and/or providing results. Based on the value of one second being less than the threshold value of three seconds, client device 210 does not evaluate and/or provide a result of evaluating the third line of program code.

As shown in FIG. 5F, and by reference number 518, assume that three seconds has now elapsed since the user stopped typing. Based on this value of three seconds being equal to the threshold value of three seconds, client device 210 generates a result associated with the program code x=[1 2, 3 4, 5 6], and provides the result via the code evaluation window, as shown by reference number 520. For example, client device 210 provides a representation of a three by two array stored in the variable x. In some implementations, client device 210 may generate and/or provide the result based on the amount of time that has elapsed being equal to or greater than the threshold value.

As shown in FIG. 5G, and by reference number 522, assume that the user has input a fourth line of program code, shown as plot(x, but that the user has not yet finished inputting the program code (e.g., by closing a parenthesis associated with the plot function). Assume that client device 210 determines that the syntax of this fourth line of program code is incorrect (e.g., due to the missing parenthesis). As shown by reference number 524, assume that the threshold time of three seconds has elapsed since the user stopped typing (e.g., since the user typed x). Even though the threshold amount of time has elapsed, client device 210 does not evaluate and/or provide a result of evaluating the fourth line of program code based on the syntax being incorrect.

As shown in FIG. 5H, and by reference number 526, assume that the user moves the cursor to a new line (e.g., by clicking on the first line of program code). Based on this user interaction, client device 210 generates a result associated with the syntactically incorrect fourth line of program code, plot(x, and provides the result via the code evaluation window, as shown by reference number 528. For example, client device 210 provides an error indicator that includes a message indicating that there is a syntax error in the fourth line of program code (e.g., "Syntax error in 'plot(x'"), and further provides a suggestion for fixing the error (e.g., "Missing right parenthesis"). In this way, client device 210 may wait to provide an error message until a clear indication is received that the user has finished inputting an erroneous line of code (e.g., waiting until the user moves to a new line of code rather than waiting the threshold amount of time). In some implementations, other evaluation triggers may be used to differentiate an erroneous line of code from an error-free line of code (e.g., different threshold values, different evaluation triggers, different combinations of evaluation triggers, etc.).

As shown in FIG. 5I, and by reference number 530, assume that the user inputs a right parenthesis to finish the plot statement, and to create a syntactically correct line of program code. Further, assume that client device 210 recognizes the plot function (e.g., as a valid function), recognizes that the required input arguments have been input for the plot function (e.g., in this case, a single input argument, x), and recognizes that the input arguments are valid. Based on this determination, client device 210 generates a result associated with the program code plot(x), and provides the result via the code evaluation window, as shown by reference number 532. For example, client device 210 provides a representation of a plot based on the three by two array stored in x. Client device 210 replaces the error message with the plot based on the corrected fourth line of program code.

As shown in FIG. 5J, and by reference number 534, assume that the user provides input to modify the third line of program code to change from old code, x=[1 2, 3 4, 5 6], to new code, shown as x=[1 2, 3 4,. Assume that the user has not yet finished modifying the third line of program code, and has kept a cursor on the third line of program code. Assume that client device 210 has detected the modification, but has not yet evaluated a result associated with the new code because client device 210 has not detected an evaluation trigger. Based on detecting the modification, client device 210 obscures (e.g., grays out) a result corresponding to the old third line of program code (e.g., x=[1 2, 3 4, 5 6]), as shown by reference number 536. In some implementations, client device 210 may also obscure the plot corresponding to the fourth line of program code because the fourth line of program code depends from the third line of program code.

As shown in FIG. 5K, and by reference number 538, assume that the user inputs new values and a right bracket to finish modifying the third line of code, and to create a new third line of program code, shown as x=[1 2, 3 4, 7 2]. Based on the user modification, and based on detecting an evaluation trigger (e.g., a closed right bracket, a threshold amount of time elapsing, etc.), client device 210 modifies the result associated with the third line of program code, and provides the result via the code evaluation window, as shown by reference number 540. For example, client device 210 has modified the bottom row of the table representing the three by two array to show the values of seven and two, which have been changed from the values of five and six, respectively. As further shown, client device 210 may make this modification while the table is still obscured, so that the change in values does not distract the user. Client device 210 may fade in the table after modifying the values, as shown in FIG. 5L.

As shown in FIG. 5L, and by reference number 542, client device 210 may fade in the table after modifying the values. As further shown, client device 210 may determine dependent lines of program code that depend from the modified third line of program code, and may modify a result corresponding to the dependent lines of program code. For example, client device 210 determines that the fourth line of program code, plot(x), depends on the modified third line of program code because these lines of program code share the variable x, and the fourth line of program code uses the value of x, determined based on the third line of program code, as input. As shown by reference number 544, client device 210 may determine a new result corresponding to the dependent fourth line of program code, and may replace an old result with the new result.

Client device 210 may replace the old result with the new result using a transition effect, such as by fading out the old result and fading in the new result, sliding the new result across the display to replace the old result, or another transition effect. FIG. 5M shows another example of a transition effect. As shown by reference number 546, client device 210 may morph the old result into the new result, or may fade out the old result and fade in the new result on top of the old result. In some implementations, a transition effect may be configurable by a user.

As shown in FIG. 5N, and by reference number 548, assume that the user inserts a new line of program code in between previously-evaluated lines of program code. For example, assume that the user inputs the new program code z=y*y. Assume that client device 210 detects an evaluation trigger for evaluating this new line of program code, and for providing a result of evaluating the new line of program code. As shown by reference number 550, client device 210 may provide a new result, shown as z=16, in the code evaluation window. Client device 210 may insert the new result between previously-generated results, as shown. Furthermore, client device 210 may fade in the new result, and/or may gradually separate the previously-generated results (e.g., y=4 and the image of the melon) to make room for the new result (e.g., by sliding the image of the melon and all results below the image downward). In this way, the user may not be distracted by the results suddenly shifting around in the code evaluation window.

As shown in FIG. 5O, and by reference number 552, assume that the user inputs a comment within the program code. The comment does not provide any output when evaluated. Thus, client device 210 may not evaluate the comment, and/or may not provide a result of evaluating the comment via the code evaluation window. As shown, no additional results are provided in the code evaluation window based on the user input of the comment.

As indicated above, FIGS. 5A-5O are provided merely as an example. Other examples are possible and may differ from what was described with regard to FIGS. 5A-5O.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Also, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
provide a user interface for displaying program code and results of evaluating at least a portion of the program code;
detect an evaluation trigger associated with the program code;
evaluate one or more portions of the program code based on the evaluation trigger; and
provide results from evaluating the one or more portions of the program code for display in the user interface while the program code is displayed in the user interface.

2. The device of claim 1, where the evaluation trigger comprises input indicating that a user has navigated to a different portion of program code other than the one or more portions of the program code.

3. The device of claim 1, where the evaluation trigger comprises input indicating that one or more keyboard inputs have been received.

4. The device of claim 1, where the evaluation trigger comprises a determination that user input has not been received for a threshold amount of time.

5. The device of claim 1, where the evaluation trigger comprises a determination that the one or more portions of the program code are error-free.

6. The device of claim 1, where the evaluation trigger comprises input indicating that a user has navigated away from the one or more portions of the program code.

7. The device of claim 1, where the evaluation trigger comprises input received from an eye tracking device.

8. A computer-readable medium storing instructions, the instructions comprising:
one or more instructions that, when executed by one or more processors, cause the one or more processors to:
provide a user interface for displaying program code and results of evaluating at least a portion of the program code;
detect an evaluation trigger associated with the program code;
evaluate one or more portions of the program code based on the evaluation trigger; and
provide results from evaluating the one or more portions of the program code for display in the user interface while the one or more portions of program code are displayed in the user interface.

9. The computer-readable medium of claim 8, where the evaluation trigger comprises user input.

10. The computer-readable medium of claim 8, where the evaluation trigger is detected without explicit user input.

11. The computer-readable medium of claim 8, where the evaluation trigger comprises a determination that a function has been input.

12. The computer-readable medium of claim 11, where the evaluation trigger comprises a determination that one or more required arguments of the function have been input.

13. The computer-readable medium of claim 12, where the evaluation trigger comprises a determination that the one or more required arguments are valid for the function.

14. The computer-readable medium of claim 8, where the evaluation trigger comprises a determination that an evaluation trigger value satisfies a threshold.

15. A computer-implemented method, comprising:
providing, by a device, a user interface for displaying program code and results of evaluating at least a portion of the program code;
detecting, by the device, an evaluation trigger associated with the program code;
evaluating, by the device, one or more portions of the program code based on the evaluation trigger; and
providing, by the device, results from evaluating the one or more portions of the program code for display in the user interface while the one or more portions of program code are displayed in the user interface.

16. The computer-implemented method of claim 15, where the evaluation trigger comprises a determination that a calculated evaluation trigger value satisfies a threshold.

17. The computer-implemented method of claim 15, further comprising:
determining that the one or more portions of the program code are associated with an error after detecting the evaluation trigger;
detecting another evaluation trigger, associated with the one or more portions of the program code, based on determining that the one or more portions of the program code are associated with the error; and
evaluating the one or more portions of the program code based on detecting the other evaluation trigger.

18. The computer-implemented method of claim 15, where the evaluation trigger is based on a program code type of the one or more portions of the program code.

19. The computer-implemented method of claim 15, where detecting the evaluation trigger comprises detecting a plurality of evaluation triggers.

20. The computer-implemented method of claim 19, where the evaluation trigger is detected based on an evaluation trigger value that is calculated based on the plurality of evaluation triggers.

* * * * *